(12) United States Patent
Suzuki

(10) Patent No.: US 7,934,995 B2
(45) Date of Patent: May 3, 2011

(54) GAME SYSTEM AND INFORMATION PROCESSING SYSTEM

(75) Inventor: Toshiaki Suzuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 979 days.

(21) Appl. No.: 11/819,401

(22) Filed: Jun. 27, 2007

(65) Prior Publication Data
US 2008/0268956 A1 Oct. 30, 2008

(30) Foreign Application Priority Data

Apr. 24, 2007 (JP) ................. 2007-114854

(51) Int. Cl.
A63F 13/00 (2006.01)
(52) U.S. Cl. ............... 463/37; 463/16; 463/20; 463/25; 463/36; 463/42; 380/251
(58) Field of Classification Search .......... 463/20, 463/30, 37, 42, 16, 25, 36; 380/251
See application file for complete search history.

(56) References Cited

U.S. PATENT DOCUMENTS

| | | | | |
|---|---|---|---|---|
| 6,104,815 A | * | 8/2000 | Alcorn et al. | 380/251 |
| 6,183,362 B1 | * | 2/2001 | Boushy | 463/25 |
| 6,190,256 B1 | * | 2/2001 | Walker et al. | 463/25 |
| 6,712,698 B2 | * | 3/2004 | Paulsen et al. | 463/30 |
| 2006/0046834 A1 | * | 3/2006 | Sekine | 463/20 |
| 2009/0176575 A1 | * | 7/2009 | Terao et al. | 463/42 |

FOREIGN PATENT DOCUMENTS

JP 09-294260 11/1997

* cited by examiner

Primary Examiner — Pierre Eddy Elisca
Assistant Examiner — Shahid Kamal
(74) Attorney, Agent, or Firm — Nixon & Vanderhye, PC

(57) ABSTRACT

A hand-held game apparatus comprises a pointing device, such as a touch panel or the like. A predetermined program including a letter recognition program is transmitted from a stationary game apparatus to a plurality of hand-held game apparatuses. Players perform handwriting input using the touch panels or the like of the respective hand-held game apparatuses. A letter recognition process is performed in each hand-held game apparatus. A result of letter recognition is transmitted to the stationary game apparatus. In the stationary game apparatus, a game process is executed based on the result of letter recognition received from each hand-held game apparatus.

17 Claims, 24 Drawing Sheets

F I G. 3
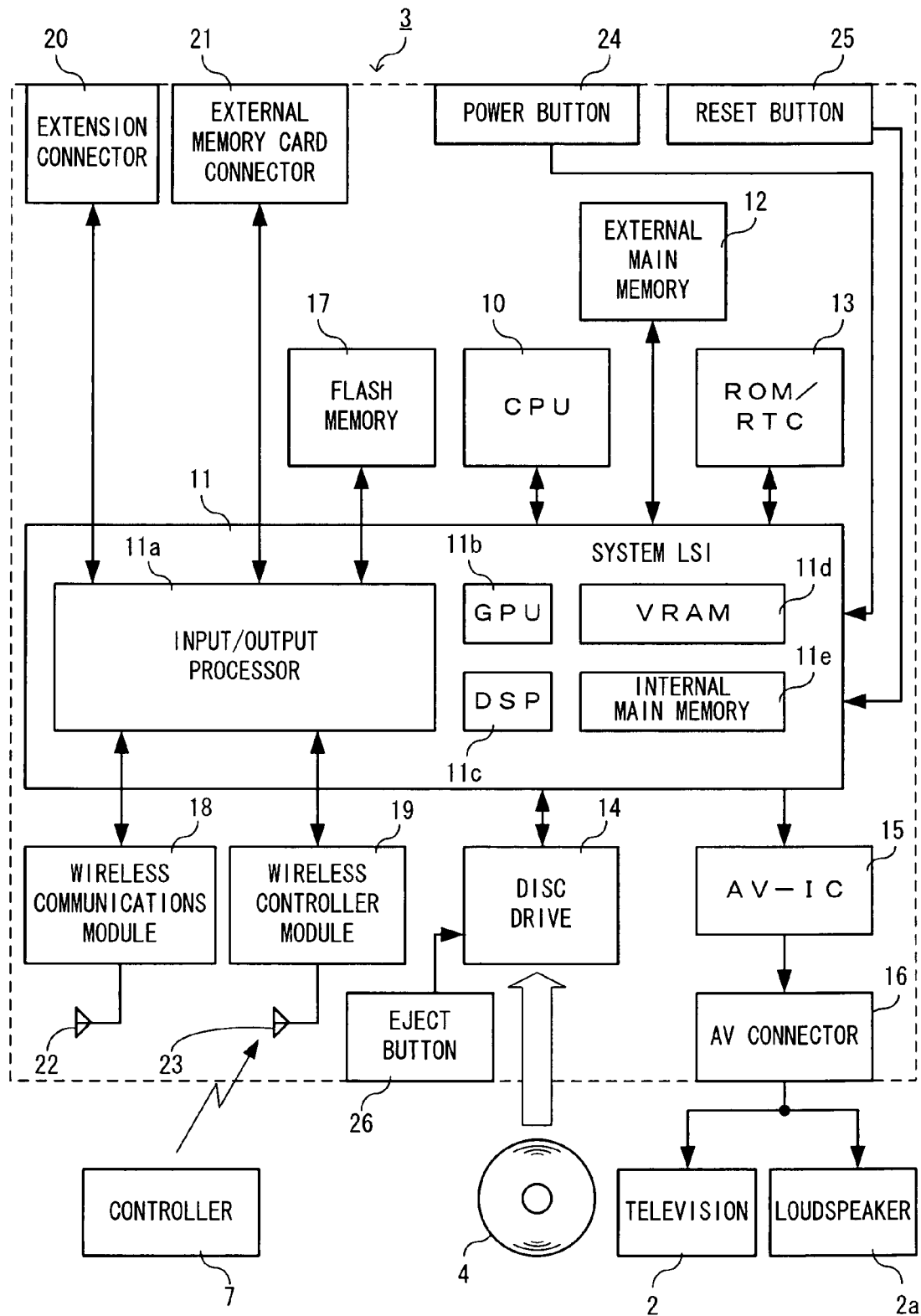

F I G. 6
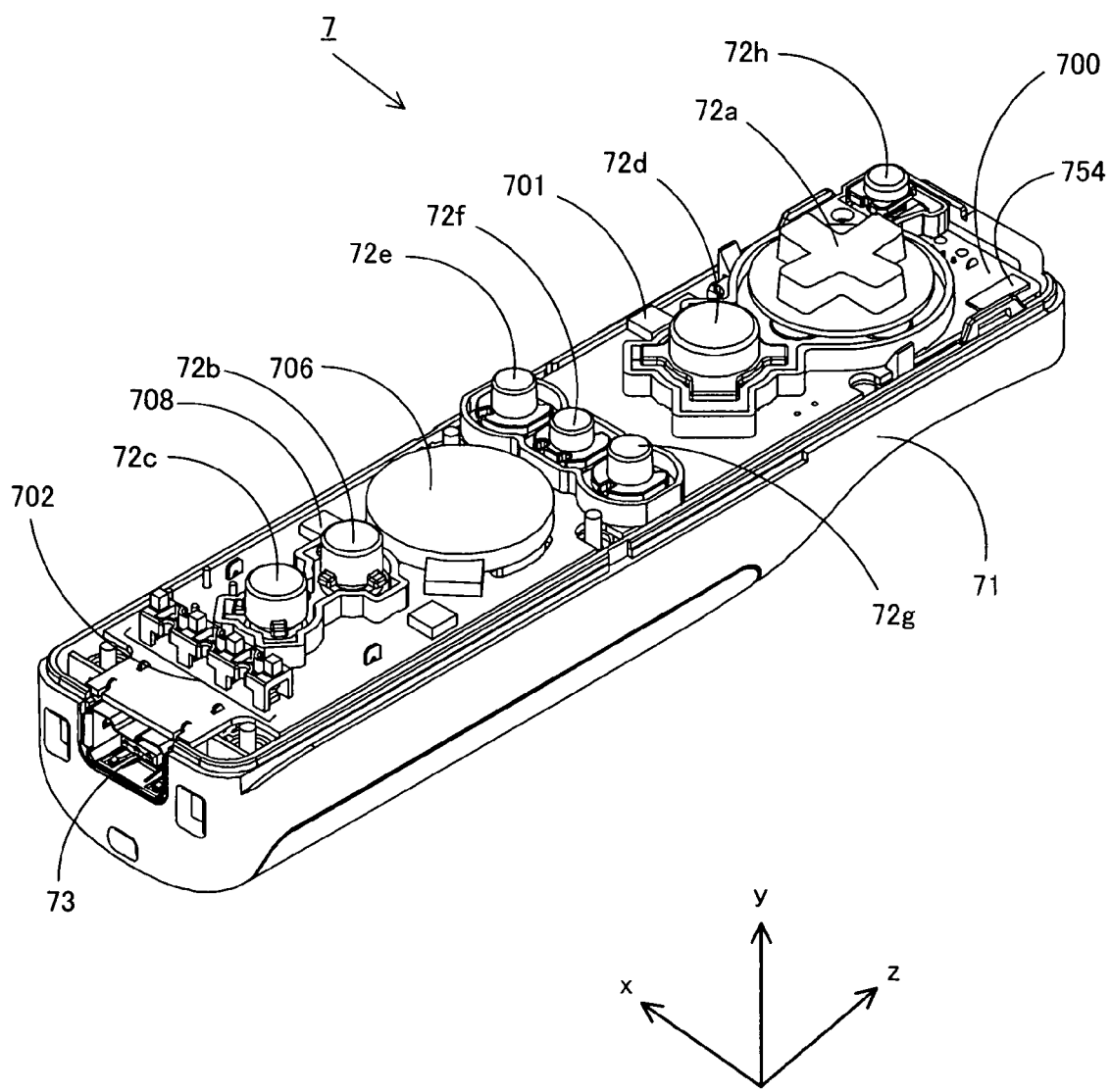

| 125 | 1251 | 1252 | 1253 | 1254 | 1255 |
|---|---|---|---|---|---|
| | QUESTION NUMBER | ANSWERING MANNER | QUESTION TEXT | ANSWER INFORMATION | KANA PRIORITY FLAG |
| | 1 | WORKING-TOGETHER | xxxxxxxx | xxxx | NO |
| | 2 | ORDINARY | xxxxxxx | xxxxxx | NO |
| | 3 | FASTEST-FIRST | xxxxxxx | xxxx | YES |
| | ⋮ | ⋮ | ⋮ | ⋮ | ⋮ |

| | 1261 | 1262 | 1263 | 1264 | 1265 |
|---|---|---|---|---|---|
| | Mii NUMBER | DS NUMBER | DS ADDRESS | PORT NUMBER | DS NAME |
| | 024 | 001 | xxxxxxxxxx | xxxx | xxxx |
| | ⋮ | ⋮ | ⋮ | ⋮ | ⋮ |

| DS NUMBER (1281) | COORDINATE DATA (1282) |
|---|---|
| 1 | |
| 2 | |
| ⋮ | ⋮ |

(b)

1282

| |
|---|
| (100, 100) |
| (101, 100) |
| (102, 100) |
| ⋮ |
| (420, 368) |
| @ |

FIRST → LAST

| DS NUMBER (1291) | RECOGNIZED LETTER CODE (1292) | ANSWER HISTORY (1293) |
|---|---|---|
| 1 | 9597 | |
| 2 | 97D1 | |
| ⋮ | ⋮ | ⋮ |

| QUESTION NUMBER (1294) | RESULT (1295) |
|---|---|
| 12 | CORRECT |
| 86 | INCORRECT |
| ⋮ | ⋮ | though the TV game apparatus and the hand-held game apparatuses are operated in association with each other, operations are controlled only using buttons. Therefore, the variety of the operation system is poor.

GAME SYSTEM AND INFORMATION PROCESSING SYSTEM

CROSS REFERENCE TO RELATED APPLICATION

The disclosure of Japanese Patent Application No. 2007-114854, filed Apr. 24, 2007, is incorporated herein by reference.

FIELD

The technology herein relates to a game system in which a game is performed via communication between a stationary game apparatus and a plurality of hand-held game apparatuses. More particularly, the technology relates to a game system in which a letter recognition process is performed with respect to an input handwritten letter by a hand-held game apparatus.

BACKGROUND AND SUMMARY

Conventionally, there have been game systems in which a game is performed via communication between a TV game apparatus and a plurality of hand-held game apparatuses. For example, in a game system described in Japanese Laid-Open Patent Publication No. 9-294260, an information processing apparatus 1 and terminal apparatuses 20-1 to 20-N are provided, the information processing apparatus 1 transmits the whole or a part of image data or a program to the terminal apparatuses 20-1 to 20-N, and a plurality of participants who operate the terminal apparatuses each cause the program to proceed based on a display screen of the respective terminal apparatus.

However, in the game system of Japanese Laid-Open Patent Publication No. 9-294260, although the TV game apparatus and the hand-held game apparatuses are operated in association with each other, operations are controlled only using buttons. Therefore, the variety of the operation system is poor.

Therefore, in certain example embodiments a game system in which a feature of a hand-held game apparatus can be more effectively utilized is provided.

Certain example embodiments have the following features to attain the object mentioned above. Note that reference numerals, additional descriptions and the like inside parentheses in this section indicate correspondence to embodiments described below for the sake of easy understanding, and are not limiting.

A first aspect of certain example embodiments is directed to a game system for performing a game via communication between a stationary game apparatus (3) and a plurality of hand-held game apparatuses (40). The plurality of hand-held game apparatuses each comprise a hand-held-side display device (41, 42), a hand-held-side display control means (51, 56, 57), a pointing device (45), a hand-held-side communications means (63), a storage means (54), a recognition process means (51), and a recognition data transmitting means (51). The hand-held-side display control means causes the hand-held-side display device to display an image. The pointing device is a device for designating a position on a screen of the hand-held-side display device. The hand-held-side communications means transmits and receives data to and from the stationary game apparatus. The storage means stores a hand-held device program including at least a recognition program for recognizing a letter or graphic input by writing by hand. The recognition process means executes the recognition program to perform a process of recognizing the letter or graphic input by writing by hand using the pointing device. The recognition data transmitting means causes the hand-held-side communications means to transmit recognition result data which is data of the recognized letter or graphic to the stationary game apparatus. The stationary game apparatus comprises a stationary-side communications means (18), a reception means (18), a game executing means (10), and a stationary-side display control means (10, 15). The stationary-side communications means transmits and receives data to and from each hand-held game apparatus. The reception means receives the recognition result data transmitted from the recognition data transmitting means. The game executing means executes a game process based on the recognition result data received by the reception means. The stationary-side display control means causes a predetermined display device to display a result of the game executed by the game executing means. The game executing means executes the game process based on the recognition result data transmitted from each of the plurality of hand-held game apparatuses.

According to the first aspect, the letter recognition process is executed in the hand-held game apparatus, and only the recognition result is transmitted to the stationary game apparatus, thereby making it possible to reduce the processing load of the stationary game apparatus. Also, the amount of communication between the hand-held game apparatus and the stationary game apparatus can be reduced, thereby making it possible to increase the speed of the whole process. Also, it is possible to provide a game in which a feature of the hand-held game apparatus is utilized.

In a second aspect based on the first aspect, the stationary game apparatus further comprises a hand-held device program transmitting means for causing the stationary-side communications means to transmit the hand-held device program to each of the plurality of hand-held game apparatuses. The plurality of hand-held game apparatuses each further comprise a hand-held device program receiving means for causing the hand-held-side communications means to receive the hand-held device program transmitted from the stationary game apparatus, and the storage means to store the hand-held device program. The recognition process means performs the recognition process by reading out and executing a letter recognition program included in the hand-held device program stored in the storage means.

According to the second aspect, the hand-held game apparatus can download a program including a letter recognition program from the stationary game apparatus. Thereby, a letter recognition program can be prepared and downloaded as required, depending on the game, thereby making it possible to provide a variety of games.

In the third aspect based on the first aspect, the hand-held device program includes a handwriting data transmitting program for causing the hand-held-side communications means to transmit, to the stationary game apparatus, handwriting data indicating a series of designated coordinate points input by writing by hand using the pointing device. The game executing means generates a handwriting image indicating a handwriting input by writing by hand, based on the transmitted handwriting data. The stationary-side display control means causes the predetermined display device to display the handwriting image.

In the fourth aspect based on the second aspect, the hand-held device program includes a handwriting data transmitting program for causing the hand-held-side communications means to transmit, to the stationary game apparatus, handwriting data indicating a series of designated coordinate points input by writing by hand using the pointing device. The game executing means generates a handwriting image indicating a handwriting input by writing by hand, based on the transmitted handwriting data. The stationary-side display control means causes the predetermined display device to display the handwriting image.

According to the third-fourth aspect, an image of a handwriting actually input by a player can be displayed. Thereby, a letter input by each player writing by hand is displayed as it is, thereby making it possible to improve the sense of realism of the game.

In a fifth aspect based on the first aspect, the hand-held device program includes a recognized letter displaying program for causing the hand-held-side display device to display a letter or graphic recognized by the letter recognition process program as a recognition result letter, and a transmission determining program for causing the recognition data transmitting means to transmit data indicating the recognition result letter as the recognition result data in accordance with a predetermined input operation.

In a sixth aspect based on the second aspect, the hand-held device program includes a recognized letter displaying program for causing the hand-held-side display device to display a letter or graphic recognized by the letter recognition process program as a recognition result letter, and a transmission determining program for causing the recognition data transmitting means to transmit data indicating the recognition result letter as the recognition result data in accordance with a predetermined input operation.

According to the fifth-sixth aspect, the recognition result data can be transmitted from the hand-held game apparatus to the stationary game apparatus in accordance with a player's own intention. Therefore, the recognition result letter input by the player can be modified, deleted or the like, thereby making it possible to prevent a recognition result which is not intended by the player from being transmitted to the stationary game apparatus.

In the seventh aspect based on the first aspect, the stationary game apparatus further comprises an analysis means for analyzing a result of a game based on the received recognition result data for each hand-held game apparatus which is a transmission source of the recognition result data, and a history storing means for storing the analyzed result in association with predetermined setting data of the transmission-source hand-held game apparatus.

According to the seventh aspect, the result of the game process can be stored in the stationary game apparatus for each player. Thereby, the game process depending on a characteristic of each player can be executed based on the stored game process result.

In a eighth aspect based on the first aspect, the stationary game apparatus further comprises a priority result transmitting means for transmitting priority result data indicating predetermined recognition result data to the hand-held game apparatus. The recognition process means outputs recognition process result data indicated by the priority result data with priority in the recognition process.

In a ninth aspect based on the second aspect, the stationary game apparatus further comprises a priority result transmitting means for transmitting priority result data indicating predetermined recognition result data to the hand-held game apparatus. The recognition process means outputs recognition process result data indicated by the priority result data with priority in the recognition process.

According to the eighth-ninth aspect, it is possible to prevent a letter written by the player from failing to be recognized as a letter which is intended by the player when the handwritten letter of the player has a peculiar feature, there are many letters similar to a letter which is intended by the player, or the like, thereby making it possible to provide a letter or the like intended by the player in the game process.

In the tenth aspect based on the first aspect, the stationary-side game apparatus further comprises a recognition range transmitting means for transmitting, to the hand-held game apparatus, recognition range data for limiting letters or graphics to be recognized in the recognition process. The recognition process means selects recognition result data from the letters or graphics set based on the recognition range data.

In the eleventh aspect based on the second aspect, the stationary-side game apparatus further comprises a recognition range transmitting means for transmitting, to the hand-held game apparatus, recognition range data for limiting letters or graphics to be recognized in the recognition process. The recognition process means selects recognition result data from the letters or graphics set based on the recognition range data.

According to the tenth-eleventh aspect, the accuracy of recognition can be improved by limiting the recognition range as required.

An twelfth aspect of certain example embodiments is directed to a game system for performing a game via communication between a stationary game apparatus (3) and a plurality of hand-held game apparatuses (40). The plurality of hand-held game apparatuses each comprise a hand-held-side display device (41, 42), a hand-held-side display control means (51, 56, 57), a microphone (56), a hand-held-side communications means (63), a storage means (54), a recognition process means (51), and a recognition data transmitting means (51). The hand-held-side display control means causes the hand-held-side display device to display an image. The hand-held-side communications means transmits and receives data to and from the stationary game apparatus. The storage means stores a hand-held device program including at least a speech recognition program for recognizing speech input using the microphone. The recognition process means executes the speech recognition program to perform a process of recognizing the speech input using the microphone. The recognition data transmitting means causes the hand-held-side communications means to transmit recognition result data which is data of the recognized speech to the stationary game apparatus. The stationary game apparatus comprises a stationary-side communications means (18), a reception means (18), a game executing means (10), and a stationary-side display control means (10, 15). The stationary-side communications means transmits and receives data to and from each hand-held game apparatus. The reception means receives the recognition result data transmitted from the recognition data transmitting means. The game executing means executes a game process based on the recognition result data received by the reception means. The stationary-side display control means causes a predetermined display device to display a result of the game executed by the game executing means. The game executing means executes the game process based on the recognition result data transmitted from each of the plurality of hand-held game apparatuses.

According to the twelfth aspect, an effect similar to that of the first aspect is obtained.

A thirteenth aspect of non-limiting illustrative embodiments is directed to an information processing system for performing an information process via communication between a stationary information processing apparatus (3) and a plurality of hand-held information processing apparatuses (40). The plurality of hand-held information processing apparatuses each comprise a hand-held-side display device (41, 42), a hand-held-side display control means (51, 56, 57), a pointing device (45), a hand-held-side communications means (63), a storage means (54), a recognition process means (51), and a recognition data transmitting means (51). The hand-held-side display control means causes the hand-held-side display device to display an image. The pointing device designates a position on a screen of the hand-held-side display device. The hand-held-side communications means transmits and receives data to and from the stationary information processing apparatus. The storage means stores a hand-held device program including at least a recognition program for recognizing a letter or graphic input by writing by hand. The recognition process means executes the recognition program to perform a process of recognizing the letter or graphic input by writing by hand using the pointing device. The recognition data transmitting means causes the hand-held-side communications means to transmit recognition result data which is data of the recognized letter or graphic to the stationary information processing apparatus. The stationary information processing apparatus comprises a stationary-side communications means (18), a reception means (18), an information process executing means (10), and a stationary-side display control means (10, 15). The stationary-side communications means transmits and receives data to and from each hand-held information processing apparatus. The reception means receives the recognition result data transmitted from the recognition data transmitting means. The information process executing means executes a predetermined information process based on the recognition result data received by the reception means. The stationary-side display control means causes a predetermined display device to display a result of the information process executed by the information process executing means. The information process executing means executes the predetermined information process based on the recognition result data transmitted from each of the plurality of hand-held information processing apparatuses.

According to the thirteenth aspect, an effect similar to the first aspect is obtained.

A fourteenth aspect of certain example embodiments is directed to a recording medium storing a program which is executed by a computer in a stationary game apparatus of a game system in which a game is performed via communication between a stationary game apparatus and a plurality of hand-held game apparatuses. The program causes the computer to execute a data transmitting step (S13), a letter data receiving step (S21), a game processing step (S24, S26), and a display control step (S26). The data transmitting step transmits, to each of the plurality of hand-held game apparatuses, data including at least a letter recognition program for performing a handwritten letter recognition based on coordinates input by the hand-held game apparatus, and transmitting letter data indicating a letter specified by the recognition to the stationary game apparatus. The letter data receiving step receives the letter data from the hand-held game apparatus. The game processing step performs a game process based on the letter data. The display control step displays a game image based on the game process on a predetermined display device.

According to the fourteenth aspect, an effect similar to that of the first aspect is obtained.

According to certain example embodiments, the processing load of the stationary game apparatus can be reduced. Also, the amount of communication between the hand-held game apparatus and the stationary game apparatus can be reduced. As a result, the processing speed of the whole system can be increased. Also, it is possible to provide a game in which a feature of the hand-held game apparatus can be utilized.

These and other objects, features, aspects and advantages in certain example embodiments will become more apparent from the following detailed description of the example embodiments when taken in conjunction with the accompanying drawings.

BRIEF DESCRIPTION OF THE DRAWINGS

FIG. 3 is a functional block diagram showing the stationary game apparatus 3 of FIG. 1;

FIG. 6 is a perspective view of the controller 7 of FIG. 3 where an upper housing thereof is removed;

FIG. 29 is a diagram showing an exemplary data structure of hand-held apparatus correspondence table 126;

FIG. 30 is a diagram showing an exemplary data structure of stroke data 128;

FIG. 31 is a diagram showing an exemplary data structure of an answer detail 129.

DETAILED DESCRIPTION

Hereinafter, an example non-limiting embodiment will be described with reference to the drawings.

Figure 1:
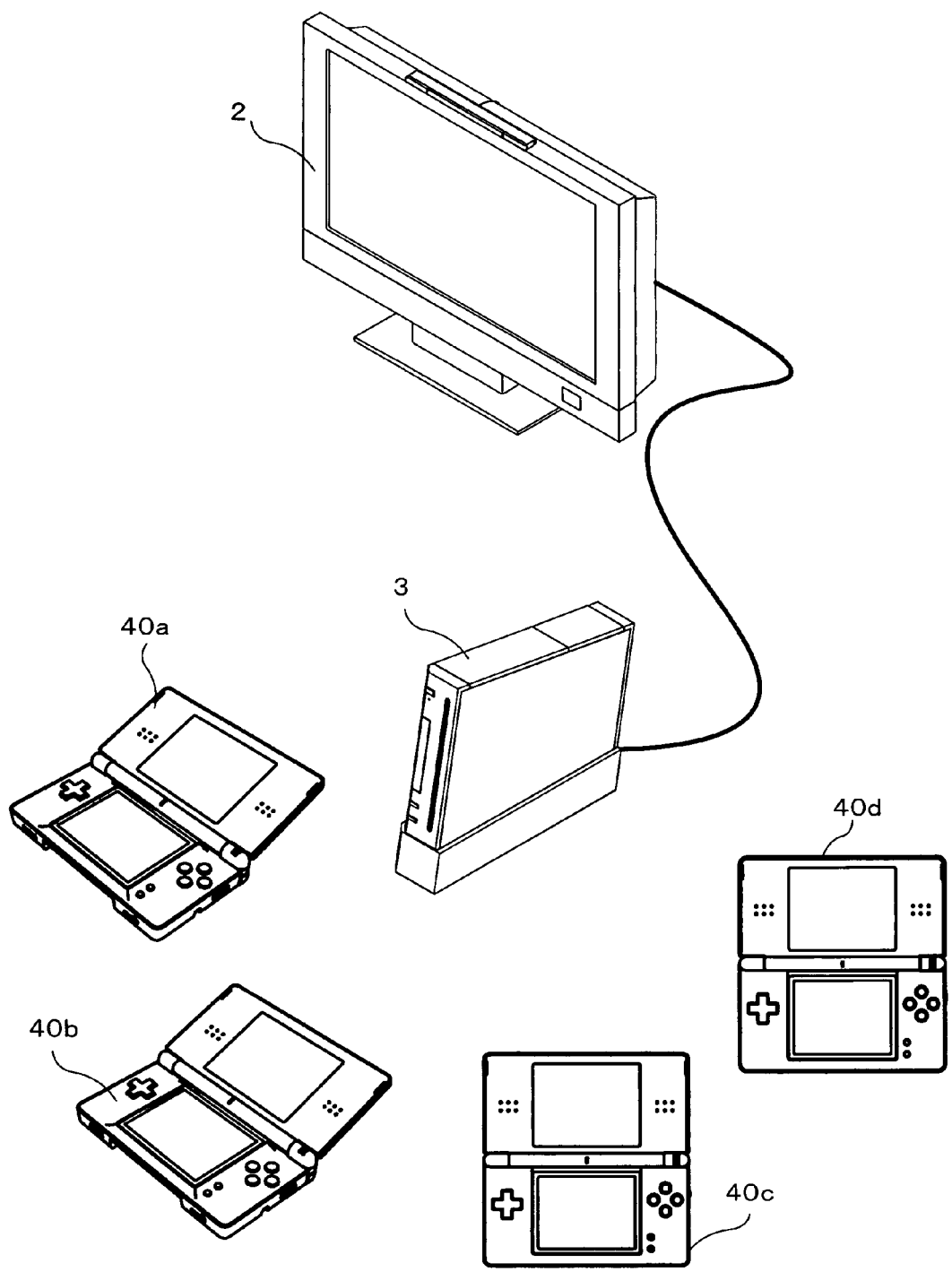
FIG. 1 is an external view for describing a whole game system according to an embodiment.

FIG. 1 is a diagram showing a whole configuration of a game system according to the embodiment. The system of FIG. 1 includes a stationary game apparatus 3 and four hand-held game apparatuses 40a to 40d. A television 2 is connected with the stationary game apparatus 3 via an AV cable. Also, each of the hand-held game apparatuses 40a to 40d is connected with the stationary game apparatus 3 via wireless communications.

(Whole Configuration of Stationary Game Apparatus 3)

Figure 2:
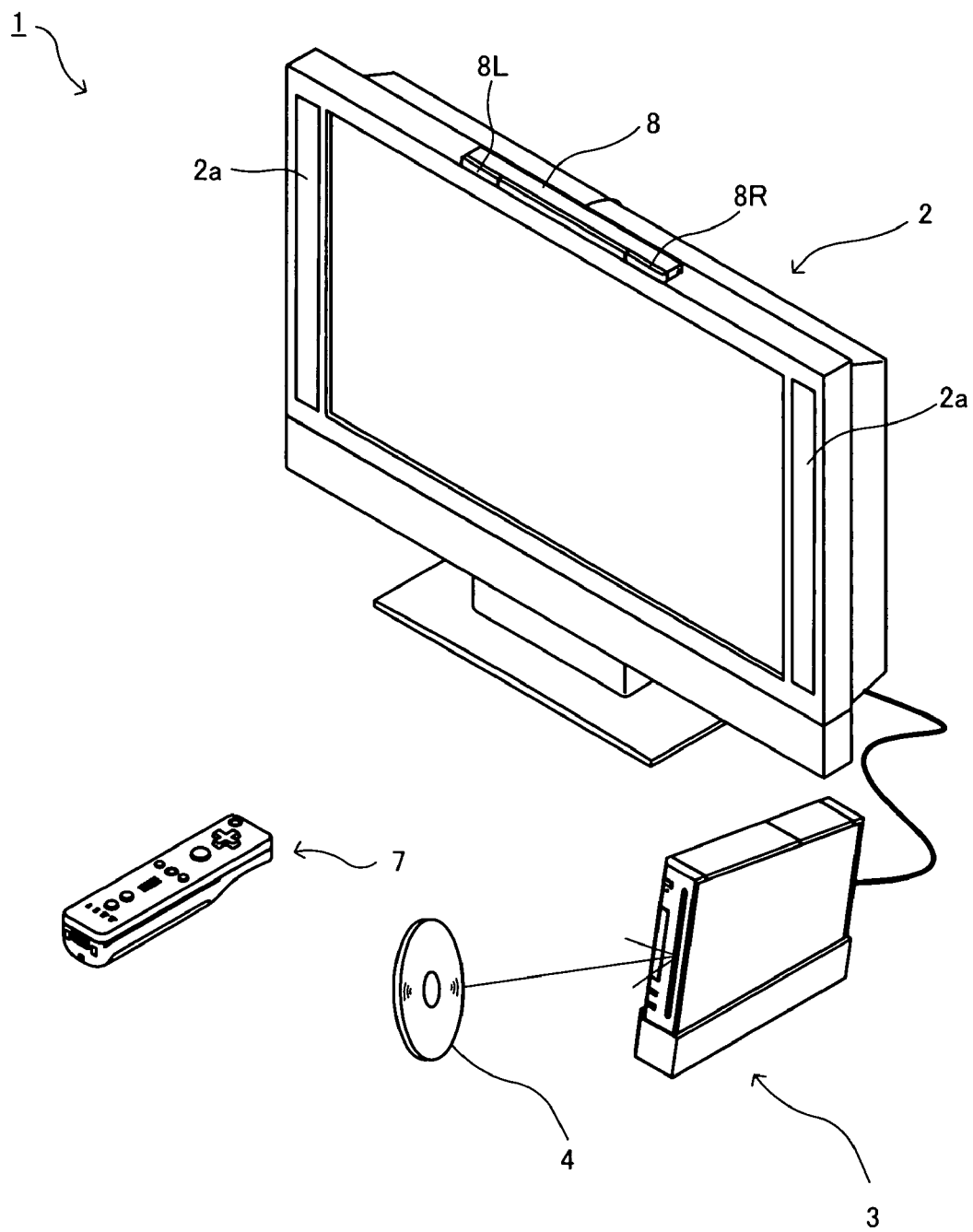
FIG. 2 is an external view for describing a game system including a stationary game apparatus 3 of FIG. 1.

Next, the stationary game apparatus 3 (e.g., "Wii®" manufactured by Nintendo Co., Ltd) according to the embodiment will be described with reference to FIG. 2. FIG. 2 is an external view of a game system 1 including the stationary game apparatus 3. In FIG. 2, the game system 1 includes the television set (hereinafter simply referred to as a "television") 2, the stationary game apparatus 3, an optical disc 4, a controller 7, and a marker portion 8. In the game system 1, a game process is executed by the stationary game apparatus 3 based on a game operation performed using the controller 7. Also, in this embodiment, a game process is executed using the hand-held game apparatuses 40a to 40d as described above.

The optical disc 4 which is an exemplary information storing medium changeable with respect to the stationary game apparatus 3 is detachably loaded into the stationary game apparatus 3. On a front surface of the stationary game apparatus 3, a slot through which the optical disc 4 is loaded or unloaded is provided. The stationary game apparatus 3 executes a game process by reading and executing a game program stored on the optical disc 4 which has been loaded through the slot.

The television 2, which is an exemplary display device, is connected via a connection cord to the stationary game apparatus 3. The television 2 displays a game image which is obtained as a result of the game process executed in the stationary game apparatus 3. The marker portion 8 is provided in the vicinity of the screen of the television 2 (on an upper side of the screen in FIG. 1). The marker portion 8 comprises two markers 8R and 8L at both ends thereof. Specifically, the marker 8R (the same is true of the marker 8L) includes one or more infrared LEDs which output infrared light toward the front of the television 2. The marker portion 8 is connected to the stationary game apparatus 3, so that the stationary game apparatus 3 can control ON/OFF of each infrared LED included in the marker portion 8.

The controller 7 is an input device which inputs operation data indicating an operation performed with respect to the controller 7, to the stationary game apparatus 3. The controller 7 and the stationary game apparatus 3 are connected via wireless communication. In this embodiment, for example, the Bluetooth(R) technology is used for wireless communication between the controller 7 and the stationary game apparatus 3. Note that, in another embodiment, the controller 7 and the stationary game apparatus 3 may be connected via wired communication.

(Internal Configuration of Stationary Game Apparatus 3)

Next, an internal configuration of the stationary game apparatus 3 will be described with reference to FIG. 3. FIG. 3 is a block diagram showing the configuration of the stationary game apparatus 3. The stationary game apparatus 3 has a CPU 10, a system LSI 11, an external main memory 12, a ROM/RTC 13, a disc drive 14, an AV-IC 15, and the like.

The CPU 10 executes a game program stored in the optical disc 4 to perform a game process, i.e., functions as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processes, such as controlling data transfer between each part connected thereto, generating an image to be displayed, obtaining data from an external apparatus, and the like. An internal configuration of the system LSI 11 will be described below. The volatile external main memory 12 stores a program, such as a game program read out from the optical disc 4, a game program read out from a flash memory 17, or the like, or various kinds of data, and is used as a work area or a buffer area for the CPU 10. The ROM/RTC 13 has a ROM (so-called boot ROM) which stores a program for booting the stationary game apparatus 3, and a clock circuit (RTC: Real Time Clock) which counts time. The disc drive 14 reads out program data, texture data or the like from the optical disc 4, and writes the read data into an internal main memory 11e (described below) or the external main memory 12.

The system LSI 11 also includes an input/output processor 11a, a GPU (Graphics Processor Unit) 11b, a DSP (Digital Signal Processor) 11c, a VRAM 11d, and the internal main memory 11e. The parts 11a to 11e are connected with each other via an internal bus (not shown).

The GPU 11b is a part of a drawing means, and generates an image in accordance with a graphics command (image drawing command) from the CPU 10. More specifically, the GPU 11b performs a calculation process required to display 3D graphics, such as coordinate conversion from 3D coordinates to 2D coordinates (preprocess before rendering) or the like, and a final rendering process, such as attaching texture or the like, in accordance with the graphics command, to generate game image data. Here, the CPU 10 inputs, to the GPU 11b, an image generating program required to generate game image data in addition to the graphics command. The VRAM 11d stores data (e.g., polygon data, texture data, etc.) which is required by the GPU 11b to execute the graphics command. When an image is generated, the GPU 11b generates image data using data stored in the VRAM 11d.

The DSP 11c functions as an audio processor, and generates audio data using sound data or sound waveform (tone color) data stored in the internal main memory 11e or the external main memory 12.

The image data and audio data thus generated are read out by the AV-IC 15. The AV-IC 15 outputs the read image data via an AV connector 16 to the television 2, and the read audio data to a loudspeaker 2a included in the television 2. Thereby, an image is displayed on the television 2 while a sound is output from the loudspeaker 2a.

The input/output processor (I/O processor) 11a executes data transmission and reception between parts connected thereto, or downloads data from an external apparatus. The input/output processor 11a is connected to the flash memory 17, a wireless communications module 18, a wireless controller module 19, an extension connector 20, and an external memory card connector 21. An antenna 22 is connected to the wireless communications module 18, and an antenna 23 is connected to the wireless controller module 19.

The input/output processor 11a is connected via the wireless communications module 18 and the antenna 22 to a network, and can communicate with other game apparatuses or various servers connected to the network. The input/output processor 11a regularly accesses the flash memory 17 to detect the presence or absence of data to be required to be transmitted to the network. In the case of the presence of the data, the input/output processor 11a transmits the data via the wireless communications module 18 and the antenna 22 to the network. The input/output processor 11a also receives data transmitted from other game apparatuses or data downloaded from a download server via the network, the antenna 22, and the wireless communications module 18, and stores the received data into the flash memory 17. The CPU 10 executes a game program to read out the data stored in the flash memory 17 and utilizes the data in the game program. In addition to data communicated between the stationary game apparatus 3 and other game apparatuses or various servers, save data (result data or interruption data of a game) of a game played using the stationary game apparatus 3 may be stored into the flash memory 17.

The input/output processor 11a also receives, via the antenna 23 and the wireless controller module 19, operation data transmitted from the controller 7, and stores (temporarily stores) the operation data into a buffer area of the internal main memory 11e or the external main memory 12.

Also, the extension connector 20 and the external memory card connector 21 are connected to the input/output processor 11a. The extension connector 20 is a connector for interface, such as USB or SCSI. When a medium (e.g., an external storage medium, etc.), a peripheral device (e.g., another controller, etc.), or a wired communications connector is connected to the extension connector 20, communication with a network can be performed instead of the wireless communications module 18. The external memory card connector 21 is a connector for connecting an external storage medium, such as a memory card or the like. For example, the input/output processor 11a can access an external storage medium via the extension connector 20 or the external memory card connector 21 to save data or read out data.

The stationary game apparatus 3 is provided with a power button 24, a reset button 25, and an eject button 26. The power button 24 and the reset button 25 are connected to the system LSI 11. When the power button 24 is turned ON, power is supplied via an AC adaptor (not shown) to each part of the stationary game apparatus 3. Also, if the power button 24 is pressed again while the power supply is ON, the stationary game apparatus 3 is transitioned to a low-power standby mode. Even in this state, the stationary game apparatus 3 is energized, so that the stationary game apparatus 3 can be always connected to a network, such as the Internet or the like. Note that the power supply which is currently ON can be turned OFF by pressing the power button 24 for a predetermined time or more. When the reset button 25 is pressed, the system LSI 11 reboots the boot program of the stationary game apparatus 3. The eject button 26 is connected to the disc drive 14. When the eject button 26 is pressed, the optical disc 4 is ejected from the disc drive 14.

Figure 4:
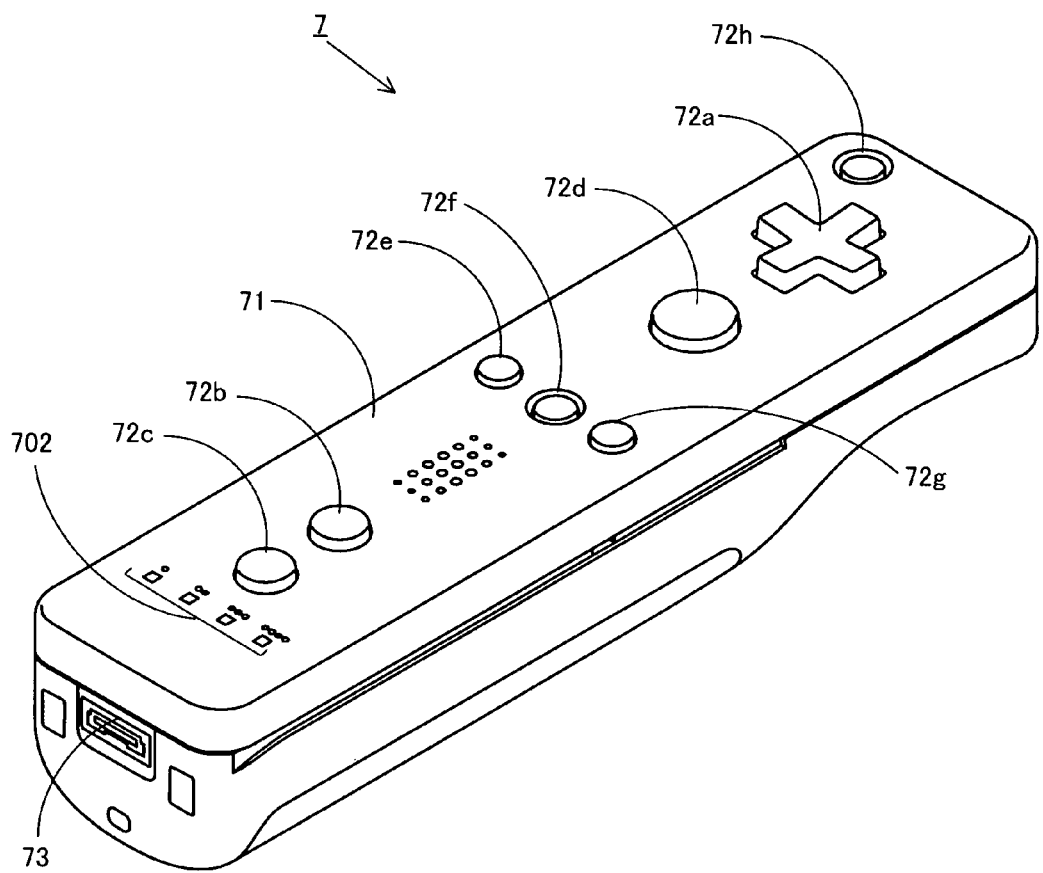
FIG. 4 is a perspective view of a controller 7 of FIG. 3 as viewed from the top and the rear.
Figure 4:
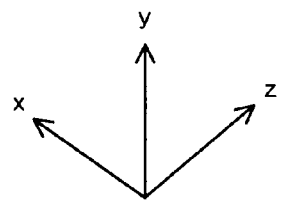

Next, the controller 7 will be described with reference to FIGS. 3 and 4. FIG. 3 is a perspective view of the controller 7 as viewed from the top and the rear. FIG. 4 is a perspective view of the controller 7 as viewed from the bottom and the front.

In FIGS. 3 and 4, the controller 7 has a housing 71, and an operation section 72 comprising a plurality of operation buttons provided on a surface of the housing 71. The housing 71 of this example is in the shape of substantially a rectangular parallelepiped where a front-to-rear direction is a longitudinal direction. The whole housing 71 has a size which allows an adult and a child to hold the controller 7 with one hand. The housing 71 is formed by, for example, plastic molding.

A cross key 72a is provided on a central portion closer to a front surface of an upper surface of the housing 71. The cross key 72a is a four-direction push switch in the shape of a cross, and has operation portions corresponding to the respective four directions (frontward, rearward, leftward, and rightward), the operation portions being provided at the respective projecting pieces of the cross which are arranged at intervals of 90°. Any one of the frontward, rearward, leftward and rightward directions is selected by a player pushing down a corresponding one of the operation portions of the cross key 72a. For example, by a player operating the cross key 72a, a movement direction of a player character or the like appearing in a virtual game world can be designated, or one can be selected and designated from a plurality of options.

Note that the cross key 72a is an operation section which outputs an operation signal, depending on the above-described direction input operation by the player, or may be an operation section of other embodiments. For example, an operation section may be provided in which four push switches are disposed in cross directions, and an operation signal is output, depending on a push switch pushed down by the player. In addition to the four push switches, a center switch may be provided at an intersection position of the cross directions, i.e., a complex operation section comprising the four push switches and the center switch may be provided. Also, instead of the cross key 72a, an operation section may be provided which outputs an operation signal, depending on a tilt direction of a tiltable stick (so-called joystick) which projects from the upper surface of the housing 71. Also, instead of the cross key 72a, an operation section may be provided which outputs an operation signal, depending on a slide direction of an disc-like member which can be moved in a horizontal direction. Also, a touch pad may be provided instead of the cross key 72a.

A plurality of operation buttons 72b to 72g are provided at the rear of the cross key 72a on the upper surface of the housing 71. The operation buttons 72b to 72g are operation sections which output operation signals assigned to the respective operation buttons 72b to 72g when a player pushes down the head portions of the respective buttons. For example, functions of a 1st button, a 2nd button, an A button, and the like are assigned to the operation buttons 72b to 72d. Functions of a minus switch, a home switch, a plus button, and the like are assigned to the operation buttons 72e to 72g. The operation buttons 72a to 72g are assigned the respective functions, depending on a game program executed by the game apparatus main body 3. Note that, in the exemplary arrangement of FIG. 3, the operation buttons 72b to 72d are aligned on a central portion in a front-to-rear direction of the upper surface of the housing 71. The operation buttons 72e to 72g are aligned in a lateral direction on the upper surface of the housing 71 and between the operation buttons 72b and 72d. The operation button 72f is a button of a type whose upper surface is buried below the upper surface of the housing 71 so that a player is prevented from unintentionally and erroneously pushing down the button.

Also, an operation button 72h is provided at the front of the cross key 72a on the upper surface of the housing 71. The operation button 72h is a power supply switch which remotely switches ON/OFF a power supply for the game apparatus main body 3. The operation button 72h is also a button of the type whose upper surface is buried below the upper surface of the housing 71 so that a player is prevented from unintentionally and erroneously pushing down the button.

A plurality of LEDs 702 are provided at the rear of the operation button 72c of the upper surface of the housing 71. Here, the controller 7 is assigned controller identification (number) so as to distinguish it from other controllers 7. For example, the LEDs 702 are used so as to inform a player of controller identification currently set for the controller 7. Specifically, when transmission data is transmitted from the controller 7 to the communication unit 6, one of the LEDs 702 is turned ON, depending on the controller identification.

Also, sound holes through which sound is emitted from a loudspeaker (a loudspeaker 706 of FIG. 5) described below to the outside are formed between the operation button 72b and the operation buttons 72e to 72g on the upper surface of the housing 71.

On the other hand, a hollow portion is formed on a lower surface of the housing 71. The hollow portion on the lower surface of the housing 71 is formed at a position where the index finger or the middle finger of a player is placed when the player holds the controller 7 with one hand while directing a front surface of the controller 7 toward the markers 8L and 8R. An operation button 72i is provided on a rear slope surface of the hollow portion. The operation button 72i is an operation section which functions as, for example, a B button.

An image capturing device 743 which is a part of the image capture information computing section 74 is provided on a front surface of the housing 71. Here, the image capture information computing section 74 is a system for analyzing image data captured by the controller 7 to determine a place having a high luminance in the image data and detect a center-of-gravity position, a size or the like of the place. The image capture information computing section 74 has, for example, a maximum sampling cycle of about 200 frames/sec, and therefore, can track and analyze relatively high-speed movement of the controller 7. A detailed structure of the image capture information computing section 74 will be described below. A connector 73 is provided on a rear surface of the housing 71. The connector 73 is, for example, an edge connector which is utilized so as to be engaged and connected with a connection cable.

Here, in order to specifically describe certain example embodiments, a coordinate system which is set with respect to the controller 7 is defined. As illustrated in FIGS. 3 and 4, X, Y and Z axes, which are orthogonal to each other, are defined with respect to the controller 7. Specifically, a front-to-rear direction of the controller 7 (a longitudinal direction of the housing 71) is assumed to be the Z axis, and a front surface (a surface on which the image capture information computing section 74 is provided) direction of the controller 7 is assumed to be the positive direction of the Z axis. A vertical direction of the controller 7 is assumed to be the Y axis, and a lower surface (a surface on which the operation button 72i is provided) direction of the housing 71 is assumed to be the positive direction of the Y axis. A lateral direction of the controller 7 is assumed to be the X axis, and a left side surface (a side surface illustrated in FIG. 4, but not in FIG. 3) direction of the housing 71 is assumed to be the positive direction of the X axis.

Figure 5:
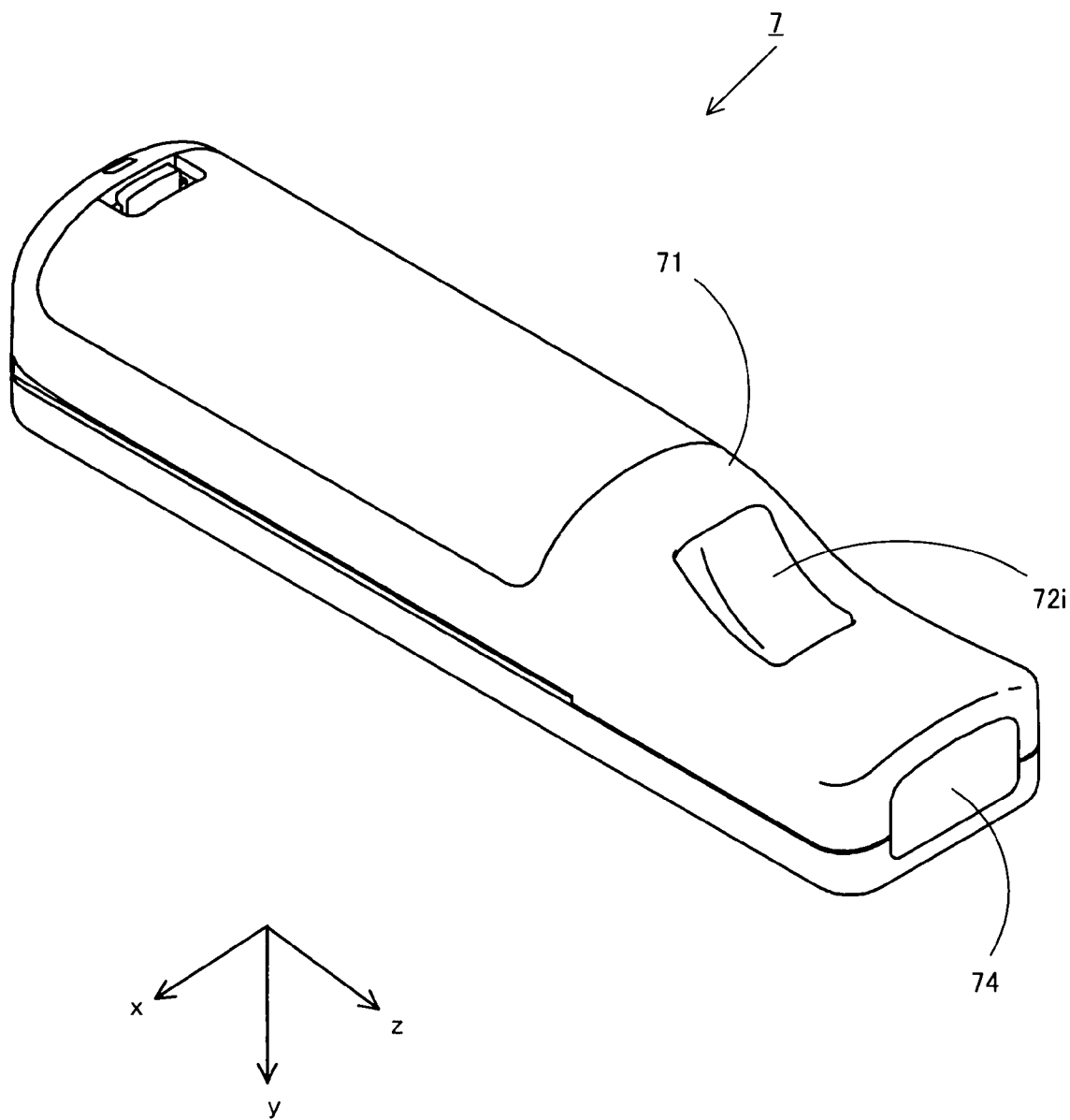
FIG. 5 is a perspective view of the controller 7 of FIG. 3 as viewed from the bottom and the front.

Next, an internal structure of the controller 7 will be described with reference to FIGS. 5 and 6. Note that FIG. 5 is a perspective view of the controller 7 (as viewed from a rear surface side thereof) where an upper housing (a portion of the housing 71) is cut away. FIG. 6 is a perspective view of the controller 7 (as viewed from a front surface side thereof) where a lower housing (a portion of the housing 71) is cut away. FIG. 6 illustrates a perspective view of a base board 700 of FIG. 5 as viewed from a bottom surface thereof.

In FIG. 5, the base board 700 is fixed inside the housing 71. On an upper major surface of the base board 700, the operation buttons 72a to 72h, an acceleration sensor 701, the LEDs 702, an antenna 754, and the like are provided. These are connected to a microcomputer 751 (see FIGS. 6 and 7) via conductors (not shown) formed on the base board 700 and the like. The microcomputer 751 functions to generate operation button data, depending on the operation button 72a or the like, as an exemplary button data generating means. This mechanism, which is a known technique, is implemented, for example, by the microcomputer 751 detecting contact/disconnection of a conductor by a switching mechanism, such as a tactile switch or the like, which is provided under a key top. More specifically, for example, when an operation button is pushed down to contact a conductor, a current flows. The microcomputer 751 detects the current flow to determine which operation button has been pushed down, and generates a signal, depending on the operation button.

Also, by a radio module 753 (see FIG. 7) and an antenna 754, the controller 7 functions as a wireless controller. Note that a quartz oscillator (not shown) is provided in the housing 71, and generates a basic clock for the microcomputer 751 (described below). Also, the loudspeaker 706 and an amplifier 708 are provided on the upper major surface of the base board 700. Also, the acceleration sensor 701 is provided on a left side of the operation button 72d on the base board 700 (i.e., a peripheral portion of the base board 700, but not a center portion thereof). Therefore, the acceleration sensor 701 can detect an acceleration including a component due to a centrifugal force as well as a change in direction of a gravitational acceleration, depending on a rotation of the controller 7 around the longitudinal direction as an axis. Therefore, by predetermined computation, the rotation of the controller 7 can be determined based on the detected acceleration data with satisfactory sensitivity by the game apparatus main body 3 or the like.

On the other hand, in FIG. 6, the image capture information computing section 74 is provided at a front edge on a lower major surface of the base board 700. The image capture information computing section 74 comprises an infrared filter 741, a lens 742, an image capturing device 743, and an image processing circuit 744, which are arranged in this order from the front of the controller 7, and are attached on the lower major surface of the base board 700. A connector 73 is attached to a rear edge on the lower major surface of the base board 700. Also, a sound IC 707 and the microcomputer 751 are provided on the lower major surface of the base board 700. The sound IC 707 is connected to the microcomputer 751 and the amplifier 708 via conductors formed on the base board 700 and the like, and outputs an audio signal via the amplifier 708 to the loudspeaker 706, depending on sound data transmitted from the game apparatus main body 3.

A vibrator 704 is attached onto the lower major surface of the base board 700. The vibrator 704 may be, for example, a vibration motor or a solenoid. The vibrator 704 is connected to the microcomputer 751 via a conductor formed on the base board 700 and the like, and its activation is switched ON/OFF, depending on vibration data transmitted from the game apparatus main body 3. The activation of the vibrator 704 generates vibration in the controller 7, so that the vibration is transferred to a player's hand holding the controller 7, thereby making it possible to achieve a so-called vibration-feature supporting game. Here, since the vibrator 704 is disposed somehow closer to the front of the housing 71, the housing 71 significantly vibrates while the player is holding the controller 7, so that the player easily feels vibration.

Next, an internal configuration of the controller 7 will be described with reference to FIG. 7. Note that FIG. 7 is a block diagram illustrating the configuration of the controller 7.

Figure 7:
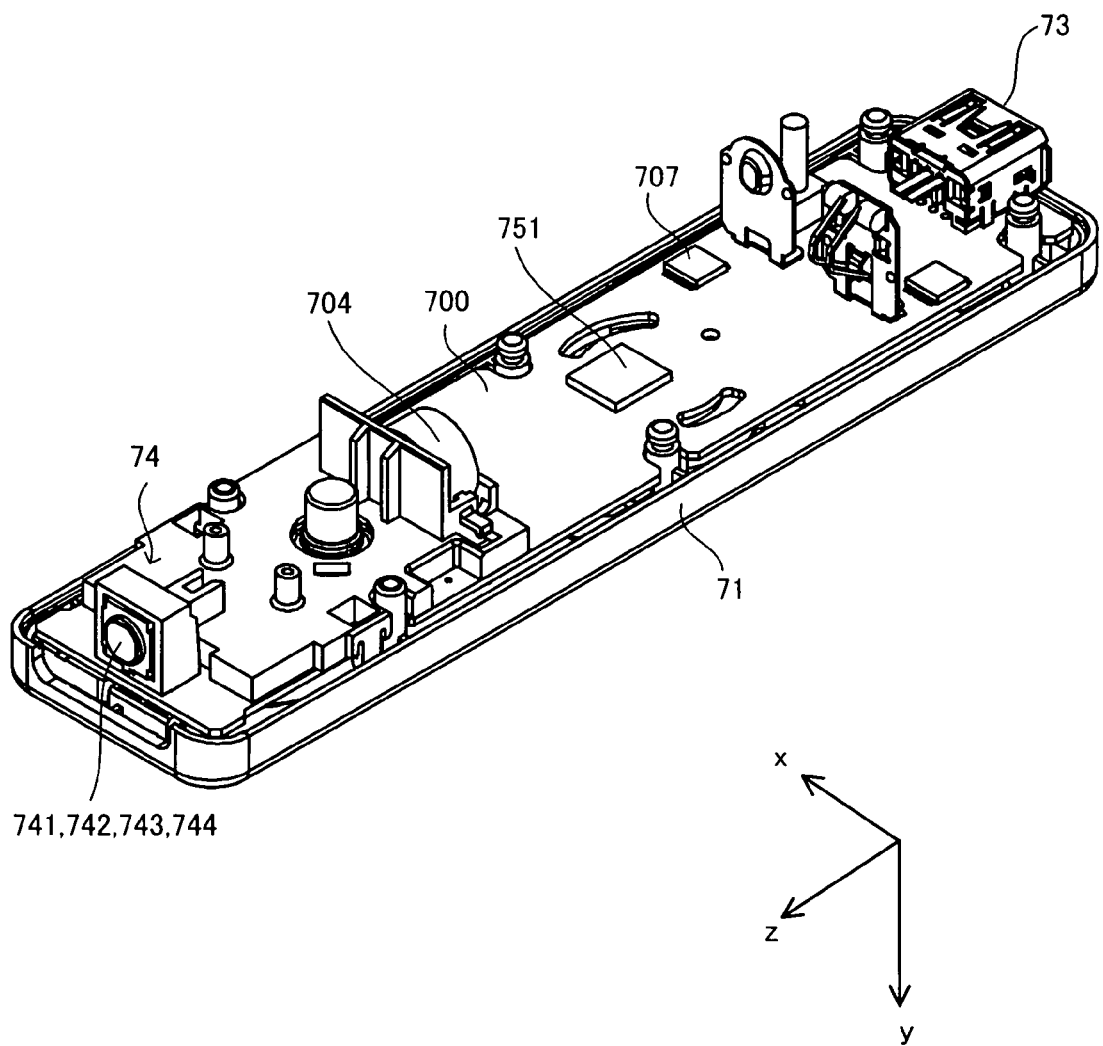
FIG. 7 is a perspective view of the controller 7 of FIG. 3 where a lower housing thereof is removed.
Figure 8:
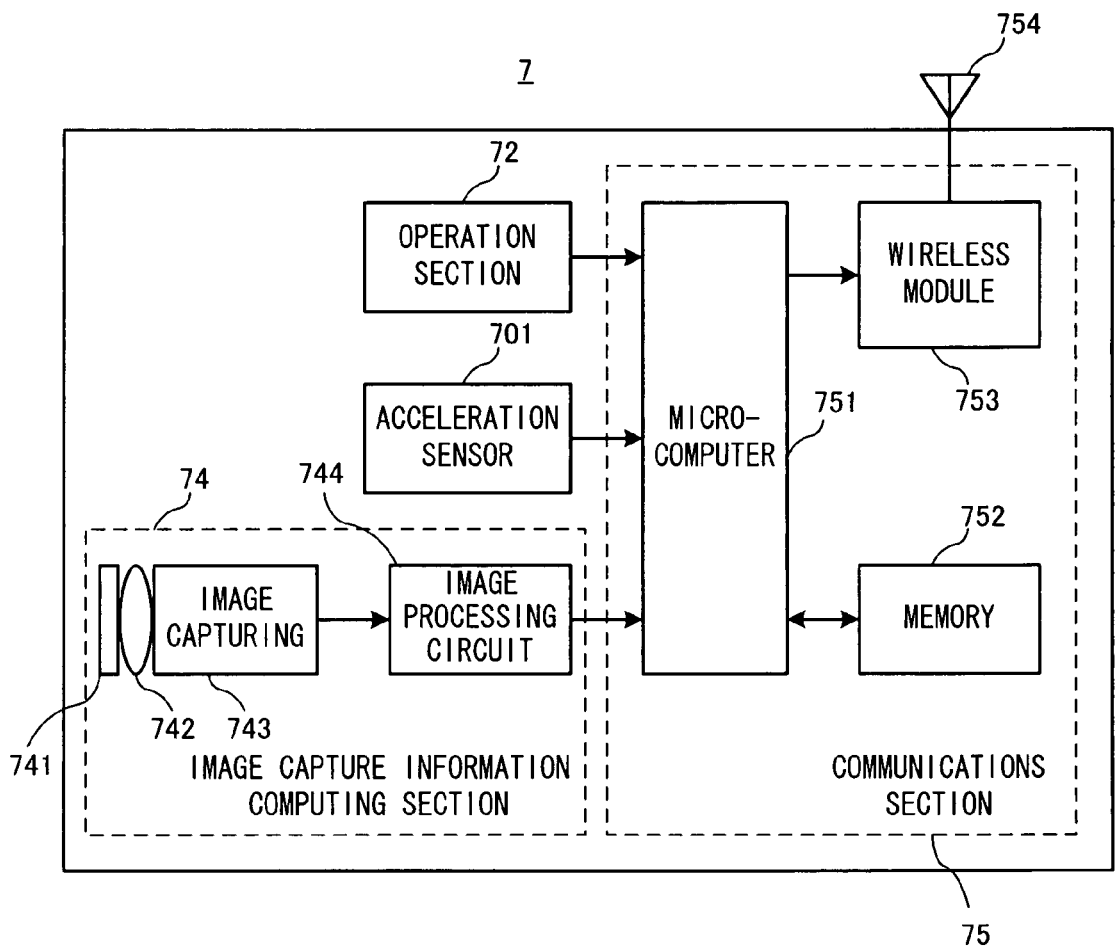
FIG. 8 is a block diagram showing a configuration of the controller 7 of FIG. 3.

In FIG. 7, the controller 7 comprises the communication section 75 in addition to the operation section 72, the image capture information computing section 74, the acceleration sensor 701, the vibrator 704, the loudspeaker 706, the sound IC 707, and the amplifier 708.

The image capture information computing section 74 includes the infrared filter 741, the lens 742, the image capturing device 743, and the image processing circuit 744. The infrared filter 741 passes only infrared light entering from the front of the controller 7. The lens 742 collects infrared light passing through the infrared filter 741 and causes the light to enter the image capturing device 743. The image capturing device 743 may be, for example, a solid-state image capturing device, such as a CMOS sensor or a CCD, and captures infrared light collected by the lens 742. Therefore, the image capturing device 743 captures only infrared light passing through the infrared filter 741 to generate image data. The image data generated by the image capturing device 743 is processed by the image processing circuit 744. Specifically, the image processing circuit 744 processes the image data obtained from the image capturing device 743 to sense a high luminance portion, and outputs process result data indicating a result of detection of position coordinates or an area thereof to the communication section 75. Note that the image capture information computing section 74 is fixed to the housing 71 of the controller 7, so that an image capturing direction thereof can be changed by changing the orientation of the housing 71 itself. A signal depending on a position or a motion of the controller 7 can be obtained based on the process result data output from the image capture information computing section 74, as described below.

The controller 7 preferably comprises the acceleration sensor 701 which senses accelerations along with three axes (X, Y and Z axes). The three-axis acceleration sensor 701 senses linear accelerations in three directions, i.e., a vertical direction, a lateral direction, and a front-to-rear direction. In another embodiment, the acceleration sensor 701 may be a two-axis acceleration detecting means which senses linear accelerations along two axes in the vertical direction and the lateral direction (or other direction pairs), depending on the type of control signals used in a game process. For example, the three- or two-axis acceleration sensors 701 may be of a type which is available from Analog Devices, Inc. or STMicroelectronics N.V. The acceleration sensor 701 is preferably of a capacitance type (capacitance coupling type) based on a technique of MEMS (Micro Electro Mechanical Systems) obtained by micromachining silicon. However, three- or two-axis acceleration sensors 701 may be provided using a technique of an existing acceleration detecting means (e.g., a piezoelectric type or a piezoelectric resistance type) or other appropriate techniques which will be developed in the future.

It is known by those skilled in the art that an acceleration detecting means used as the acceleration sensor 701 can sense only an acceleration (linear acceleration) along a straight line corresponding to each axis of the acceleration sensor 701. In other words, a direct output from the acceleration sensor 701 is a signal indicating a linear acceleration (static or dynamic) along each of the two or three axes. Therefore, the acceleration sensor 701 cannot directly sense physical properties, such as a motion along a non-linear path (e.g., an arc, etc.), a rotation, a rotational motion, an angular displacement, a tilt, a position, an attitude, and the like.

However, it can be easily understood by those skilled in the art from the description of the present specification that, by a computer, such as a processor (e.g., the CPU 30) of the game apparatus 3, a processor (e.g., the microcomputer 751) of the controller 7 or the like, executing a process based on a signal relating to an acceleration output from the acceleration sensor 701, additional information about the controller 7 can be estimated or calculated (determined). For example, a process may be performed by the computer, assuming that the controller 7 having the acceleration sensor 701 is in the static state (i.e., assuming that an acceleration detected by the acceleration sensor 701 is only a gravitational acceleration). In this case, if the controller 7 is actually in the static state, it can be determined based on the detected acceleration whether or not or how much the attitude of the controller 7 is tilted with respect to the gravity direction. Specifically, if a state of the acceleration sensor 701 whose detected axis is oriented vertically downward is assumed as a reference, it can be determined whether or not the controller 7 is tilted, based on whether or not 1 G (gravitational acceleration) is applied to the acceleration sensor 701, and it can be determined how much the controller is tilted, based on the magnitude of the acceleration detected by the acceleration sensor 701. Also, in the case of a multi-axis acceleration sensor, by subjecting an acceleration signal of each axis to a process, it can be determined in more detail how much the controller 7 is tilted with respect to the gravity direction. In this case, a processor may perform a process of calculating data about a tilt angle of the controller 7 based on the output of the acceleration sensor 701. Alternatively, a process of estimating the tilt approximately may be estimated based on the output of the acceleration sensor 701 without the process of calculating the data about the tilt angle. Thus, by using a processor in combination with the acceleration sensor 701, a tilt, an attitude or a position of the controller 7 can be determined On the other hand, when it is assumed that the acceleration sensor 701 is in the dynamic state, an acceleration depending on a motion of the acceleration sensor 701 in addition to the gravitational acceleration component, a motion direction or the like can be determined by removing the gravitational acceleration component by a predetermined process. Specifically, when the controller 7 comprising the acceleration sensor 701 is dynamically accelerated by a user's hand, varying motions and/or positions of the controller 7 can be calculated by processing an acceleration signal generated by the acceleration sensor 701. Note that, even if it is assumed that the acceleration sensor 701 is in the dynamic state, a tilt with respect to the gravity direction can be determined by removing an acceleration depending on a motion of the acceleration sensor 701 by a predetermined process. In another example, the acceleration sensor 701 may comprise a built-in signal processing device or another type of dedicated processing device for performing a desired process with respect to an acceleration signal output from a built-in acceleration detecting means before outputting a signal to the microcomputer 751. For example, if the acceleration sensor 701 detects a static acceleration (e.g., the gravitational acceleration), the built-in or dedicated processing device may convert a sensed acceleration signal into a tilt angle corresponding thereto (or another preferable parameter).

In another embodiment, as an acceleration sensor for detecting a motion of the controller 7, a gyro-sensor comprising a rotation element, a vibration element, or the like may be employed. An exemplary MEMS gyro-sensor used in this embodiment is available from Analog Devices, Inc. As is different from the acceleration sensor 701, the gyro-sensor can directly sense a rotation (or an angular velocity) about an axis of at least one gyro-element included therein. Thus, since the gyro-sensor and the acceleration sensor are basically different from each other, one of them is selected, depending on the individual application, and processes performed for output signals from these devices need to be changed as appropriate.

Specifically, when a tilt or an attitude is calculated using a gyro-sensor instead of an acceleration sensor, a significant change is required. Specifically, when a gyro-sensor is used, the value of a tilt is initialized during the start of detection. Thereafter, angular acceleration data output from the gyro-sensor is integrated. Next, the amount of a change in tilt is calculated from the initialized tilt value. In this case, the calculated tilt has a value corresponding to an angle. On the other hand, when an acceleration sensor is used to calculate a tilt, the tilt is calculated by comparing the value of a component about each axis of a gravitational acceleration with a predetermined reference. Therefore, the calculated tilt can be represented by a vector, and an absolute direction can be detected by the acceleration detecting means without initialization. Also, whereas a value calculated as a tilt is an angle when a gyro-sensor is used, the value is a vector when an acceleration sensor is used. Therefore, when a gyro-sensor is used instead of an acceleration sensor, the tilt data needs to be subjected to predetermined conversion, taking into consideration a difference between the two devices. The properties of gyro-sensors as well as the basic difference between the acceleration detecting means and the gyro-sensor are know to those skilled in the art, and will not be herein described in more detail. Whereas gyro-sensors have an advantage of directly sensing rotation, acceleration sensors generally have an advantage over the gyro-sensor in terms of cost effectiveness when the acceleration sensor is applied to a controller as used in this embodiment.

The communication section 75 comprises the microcomputer 751, the memory 752, the radio module 753, and the antenna 754. The microcomputer 751 controls the radio module 753 for wirelessly transmitting transmission data while using the memory 752 as a memory area during a process. Also, the microcomputer 751 controls operations of the sound IC 707 and the vibrator 704, depending on data from the game apparatus main body 3 which is received by the radio module 753 via the antenna 754. The sound IC 707 processes sound data or the like transmitted from the game apparatus main body 3 via the communication section 75. Also, the microcomputer 751 activates the vibrator 704, depending on vibration data (e.g., a signal for switching ON/OFF the vibrator 704) or the like transmitted from the game apparatus main body 3 via the communication section 75.

An operation signal (key data) from the operation section 72 provided in the controller 7, acceleration signals (X-, Y- and Z-axis direction acceleration data; hereinafter simply referred to as acceleration data) from the acceleration sensor 701, and process result data from the image capture information computing section 74, are output to the microcomputer 751. The microcomputer 751 temporarily stores the received data (the key data, the X-, Y- and Z-axis direction acceleration data, and the process result data), as transmission data to be transmitted to the communication unit 6, into the memory 752. Here, radio transmission from the communication section 75 to the communication unit 6 is performed in predetermined cycles. Since a game is generally processed in units of 1/60 sec, the cycle of the radio transmission needs to be shorter than 1/60 sec. Specifically, the game processing unit is 16.7 ms (1/60 sec), and the transmission interval of the communication section 75 employing Bluetooth(R) is 5 ms. When timing of transmission to the communication unit 6 arrives, the microcomputer 751 outputs transmission data stored in the memory 752, as a series of pieces of operational information, to the radio module 753. Thereafter, the radio module 753 modulates the operational information using a carrier wave having a predetermined frequency and emits the resultant radio signal from the antenna 754, by means of, for example, the Bluetooth(R) technique. Specifically, the key data from the operation section 72 provided in the controller 7, the acceleration data from the acceleration sensor 701, and the process result data from the image capture information computing section 74 are modulated into a radio signal by the radio module 753, and the radio signal is transmitted from the controller 7. Thereafter, the communication unit 6 of the stationary game apparatus main body 3 receives the radio signal, and the stationary game apparatus main body 3 demodulates or decodes the radio signal, thereby obtaining a series of pieces of operational information (the key data, the X-, Y- and Z-axis direction acceleration data, and the process result data). Thereafter, the CPU 30 of the stationary game apparatus main body 3 performs a game process based on the obtained operational information and a game program. Note that, when the communication section 75 is configured using the Bluetooth(R) technique, the communication section 75 can also have a function of receiving transmission data wirelessly transmitted from other devices.

(Configuration of Hand-Held Game Apparatus 40)

Figure 9:
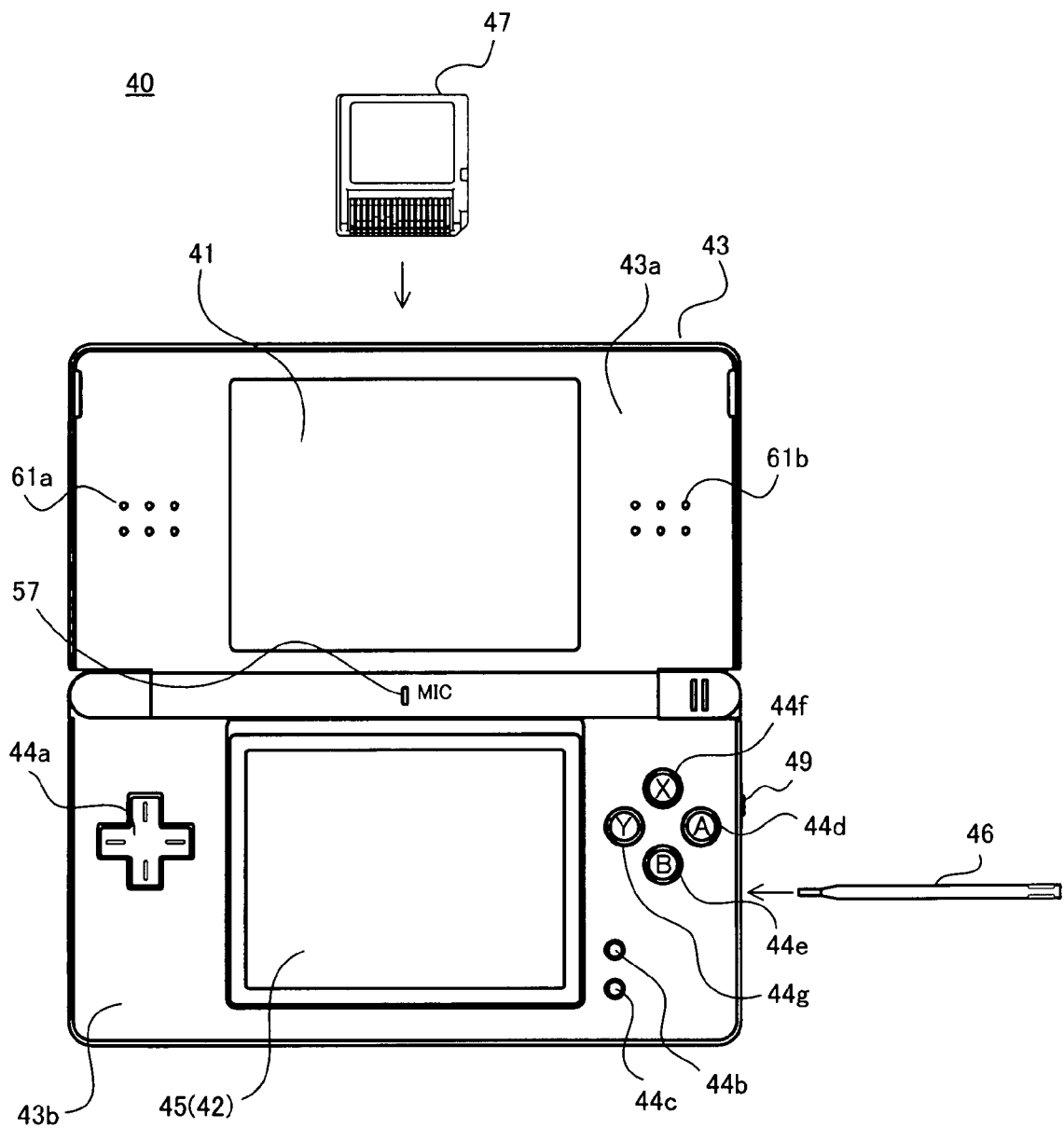
FIG. 9 is an external view showing a hand-held game apparatus 40 according to certain example embodiments.
Figure 10:
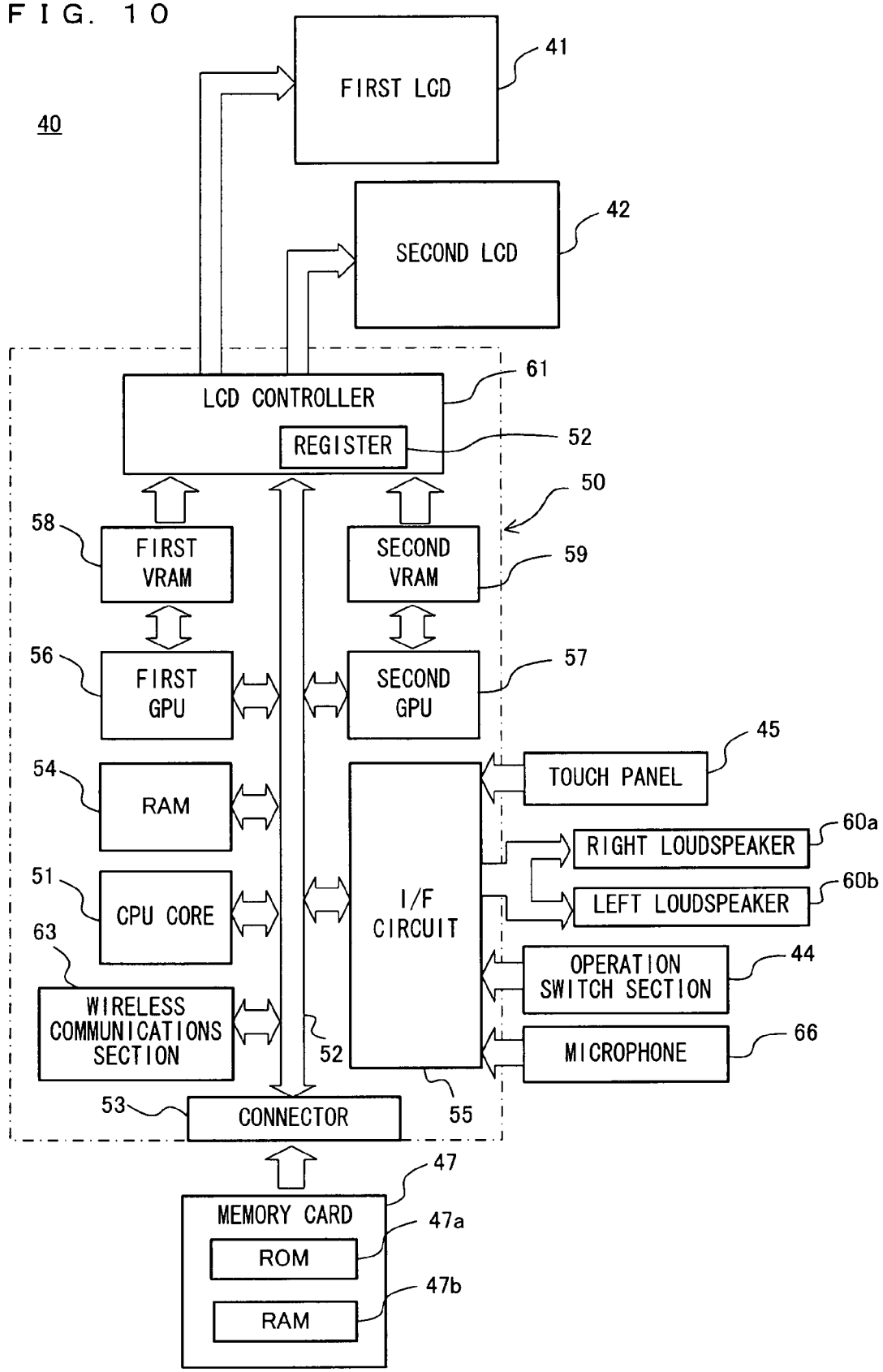
FIG. 10 is a block diagram showing the hand-held game apparatus 40 of the embodiment.

FIG. 9 is an external view of a hand-held game apparatus 40 (e.g., Nintendo DSC) manufactured by Nintendo Co., Ltd) according to an embodiment. FIG. 10 is a perspective view of the hand-held game apparatus 40. In FIG. 10, the game apparatus 40 includes a first LCD (liquid crystal display device) 41 and a second LCD 42. A housing 43 comprises an upper housing 43a and a lower housing 43b. The first LCD 41 is housed in the upper housing 43a, while the second LCD 42 is housed in the lower housing 43b. The first LCD 41 and the second LCD 42 each have a resolution of 256 dots×192 dots. Although an LCD is used as a display device in this embodiment, any other display devices, such as a display device employing EL (Electro Luminescence) and the like, can be used. Also, the display device can have any resolution.

Sound holes 61a and 61b through which sound is emitted from a pair of loudspeakers (60a and 60b in FIG. 10) described below to the outside are formed on the upper housing 43a.

A microphone hole 57 is provided in a hinge portion which connects the upper housing 43a and the lower housing 43b in a manner which enables the upper housing 43a and the lower housing 43b to be opened and closed.

On the lower housing 43b, a cross switch 44a, a start switch 44b, a select switch 44c, an A-button 44d, a B-button 44e, an X-button 44f, and a Y-button 44g are provided as input devices. As an additional input device, a touch panel 45 is attached onto a screen of the second LCD 42. A guide frame is attached onto a surface of the touch panel 45. In addition, the lower housing 43b is provided with a power switch 49, a slot into which a memory card 47 is inserted, and a slot into which a stylus pen 46 are inserted.

The touch panel 45 is of a resistance film type. However, other pressure-sensitive touch panels may be used. The touch panel 45 can be operated using a finger can be used instead of the stylus pen 46. In this embodiment, the touch panel 45 has the same resolution (detection precision) as that of the second LCD 42, i.e., 256 dots×192 dots. Note that the touch panel 45 and the second LCD 42 do not need to have the same resolution.

The memory card 47 is a storage medium which stores a game program, and is detachably inserted into the slot provided in the lower housing 43b.

Next, an internal configuration of the hand-held game apparatus 40 will be described with reference to FIG. 10.

In FIG. 10, a CPU core 51 is provided on an electronic circuit board 50 which is housed in the housing 43. A connector 53, an input/output interface circuit (denoted as OF circuit in FIG. 10) 55, a first GPU (Graphics Processing Unit) 56, a second GPU 57, a RAM 54, an LCD controller 61, and a wireless communications section 63 are connected via a bus 52 to the CPU core 51. The memory card 47 is detachably connected to the connector 53. The memory card 47 comprises a ROM 47a which stores a game program, and a RAM 47b which stores rewritable backup data. The game program stored in the ROM 47a of the memory card 47 is loaded into the RAM 54, and the game program loaded in the RAM 54 is executed by the CPU core 51. In addition to the game program, the RAM 54 stores temporary data obtained by the CPU core 51 executing the game program, data for generating a game image, and the like. The touch panel 45, the right loudspeaker 60a, the left loudspeaker 60b, an operation switch section 44 including the cross switch 44a, the A-button 44d, and the like of FIG. 1, and the microphone 56 are connected to the OF circuit 55. The right loudspeaker 60a and the left loudspeaker 60b are provided inside under the sound holes 61a and 61b, respectively. The microphone 56 is provided inside the microphone hole 57.

A first VRAM (Video RAM) 58 is connected to the first GPU 56, and a second VRAM 59 is connected to the second GPU 57. The first GPU 56 generates a first game image based on data for generating a game image, the data being stored in the RAM 54, and draws the first game image into the first VRAM 58, in accordance with a command from the CPU core 51. Similarly, the second GPU 57 generates a second game image and draws the second game image into the second VRAM 59 in accordance with a command from the CPU core 51. The first VRAM 58 and the second VRAM 59 are connected to the LCD controller 51.

The LCD controller 61 includes a register 62. The register 62 stores a value of 0 or 1 in accordance with a command from the CPU core 51. When the value of the register 62 is 0, the LCD controller 61 outputs the first game image drawn in the first VRAM 58 to the first LCD 41, and outputs the second game image drawn in the second VRAM 59 to the second LCD 42. When the value of the register 62 is 1, the LCD controller 61 outputs the first game image drawn in the first VRAM 58 to the second LCD 42, and outputs the second game image drawn in the second VRAM 59 to the first LCD 41.

The wireless communications section 63 has a function of exchanging data to be used in a game process or other data with other game apparatuses.

In certain example embodiments a device other than a game apparatus may be used. For example, any device having a pressure-sensitive touch panel supported by a housing may be used. For example, a hand-held game apparatus, a controller for a stationary game apparatus, and a PDA (Personal Digital Assistant). Further, in certain example embodiments an input device in which a display is not provided below a touch panel may be used.

Figure 11:
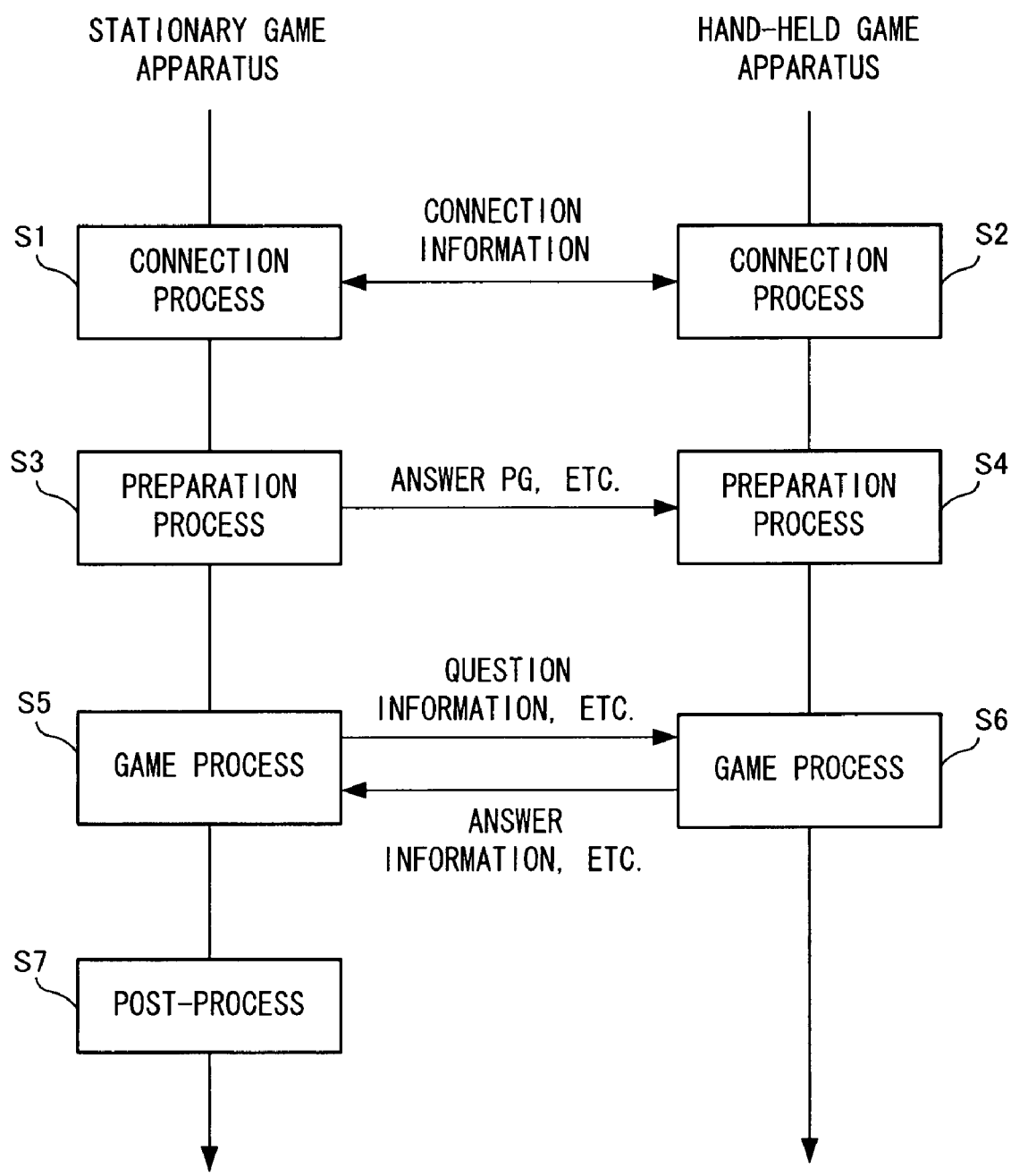
FIG. 11 is a diagram showing an outline of a flow of a quiz game process assumed in this embodiment.

Next, an outline of a game assumed in this embodiment will be described with reference to FIGS. 11 to 23. The game assumed in this embodiment is a quiz game which can be played by a number of people. Here, as shown in FIG. 1, the quiz game is assumed to be executed by a stationary game apparatus 3 (hereinafter also simply referred to as a "Wii") and four hand-held game apparatuses (hereinafter also simply referred to as "DSs"), for example. FIG. 11 is a diagram showing an outline of the flow of the quiz game assumed in this embodiment. FIGS. 12 to 23 show exemplary screens of the quiz game assumed in this embodiment.

An outline of the whole quiz game process assumed in this embodiment will be described with reference to FIG. 11. The process of FIG. 11 is executed between the Wii and each of the DSs. Initially, a connection process is executed to establish connection between the Wii and the DSs so that the Wii and the DSs can perform wireless communication (steps 51 and S2). Note that, in this embodiment, communication between the Wii and the DSs is performed using a protocol conforming to the IEEE802.11 standards. Next, a preparation process is performed for execution of the quiz game (steps S3 and S4). In this process, mainly, a process of transmitting an answer program which is used in an answer operation by a player from the Wii to each DS, a process of selecting a character image for representing a corresponding player, and the like are performed. Next, a quiz game process is executed (steps S5 and S6). Here, a process of transmitting an answer input by each player on the DS to the Wii, a process of determining the result of the answer, and the like (core processes of the quiz game) are performed. Finally, when the quiz game is ended, a post-process for saving the history of player's answers into the Wii is performed (step S7).

Figure 12:
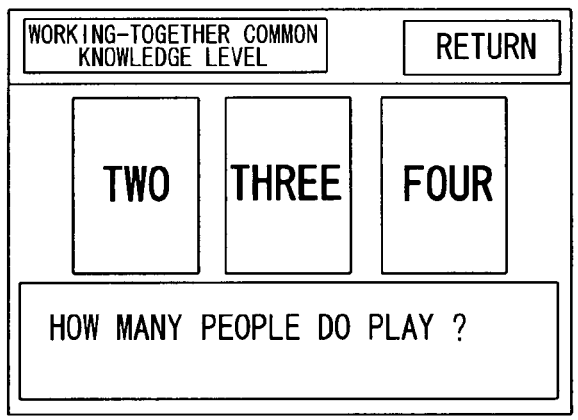
FIG. 12 is a diagram showing an exemplary screen of the quiz game assumed in this embodiment.

Next, the outlines of the processes described above will be described using exemplary screens. Firstly, the connection process in steps S1 and S2 of FIG. 11 will be described. A player starts up the quiz game of this embodiment in the stationary game apparatus. After the quiz game is started up, a menu screen (not shown) is displayed. The player selects a multiplayer game mode using the controller 7. Then, a number-of-players select screen as shown in FIG. 12 is displayed. The player selects and inputs the number of players using the controller 7. Here, it is assumed that the number of players is selected as four.

Figure 13:
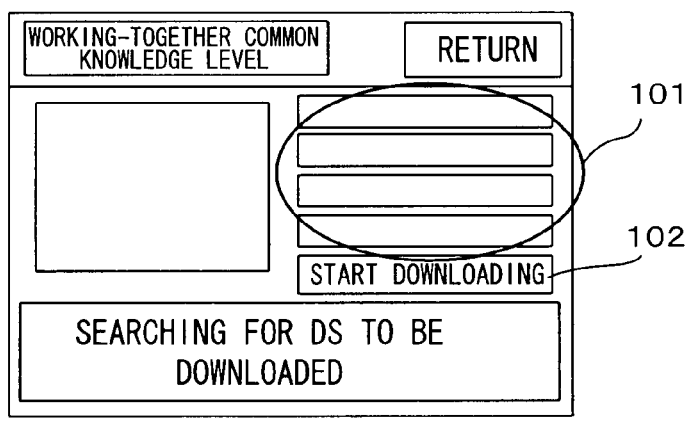
FIG. 13 is a diagram showing an exemplary screen of the quiz game assumed in this embodiment.

After the number of players is selected, a screen for indicating the connection statuses of the hand-held game apparatuses is displayed as shown in FIG. 13. In FIG. 13, a DS name area 101, a download button 102, and the like are displayed. The names of DSs which have established connection is displayed in the DS name area 101. The download button 102 is a button for transmitting an answer program to the DSs. The download button 102 is designed not to be operated until DSs the number of which was designated on the number-of-players select screen have been connected.

Figure 14:
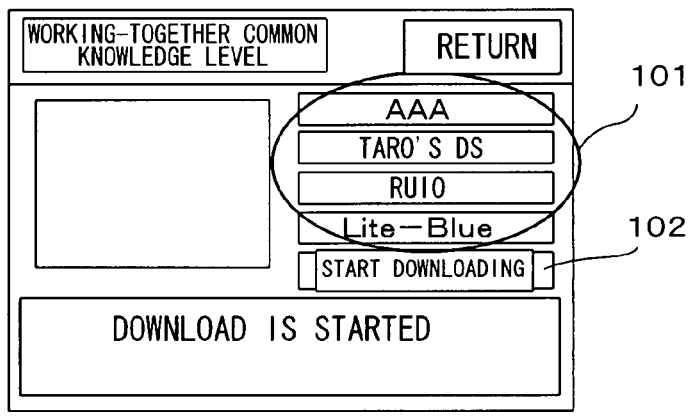
FIG. 14 is a diagram showing an exemplary screen of the quiz game assumed in this embodiment.

If the screen indicating the connection status is displayed, each player starts up his/her DS. Thereafter, each player selects a "download mode" from the start-up menu of the DS. The "download mode" as used herein refers to a mode in which a player downloads a predetermined program to his/her DS from another DS, a stationary game apparatus (the Wii, etc.), a predetermined server, or the like, but does not start up a program stored in the memory card 47 inserted in his/her DS. After the "download mode" is started up, a search for a connection destination is started. As a result, the DS finds the Wii as a connection destination, and executes a process for establishing connection with the Wii. As a result, if connection with the Wii is established, a "DS name" which has been previously set in the DS main body is displayed in the DS name area 101. When connection has been completed for all the four players, four DS names are displayed in the DS name area 101 as shown in FIG. 14, and the download button 102 becomes operable. The outline of the connection process has heretofore been described.

Next, an outline of the preparation process in steps S3 and S4 will be described. A player performs an operation for pressing the download button 102 using the controller 7. After the download button 102 is pressed, the answer program is started to be transmitted to each DS. In this case, by utilizing a time until the transmission/reception of the answer program is completed, a process of selecting characters for identifying the players in the quiz game is executed. The "character" as used herein refers to a character object which is previously created by the owner of the Wii main body and is saved in the flash memory 17 of the Wii main body. Hereinafter, the character object is referred to as a "Mii (me)".

Figure 15:
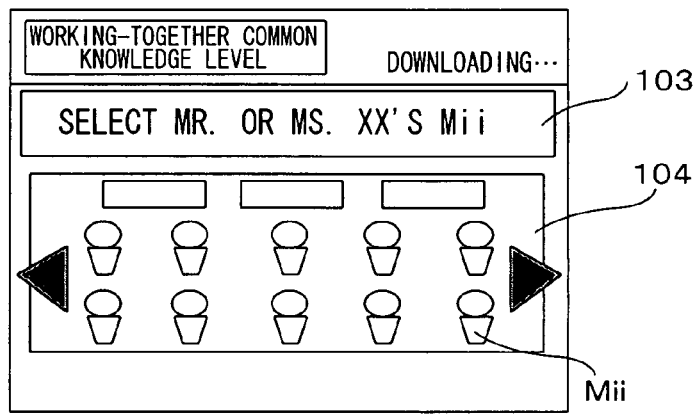
FIG. 15 is a diagram showing an exemplary screen of the quiz game assumed in this embodiment.
Figure 16:
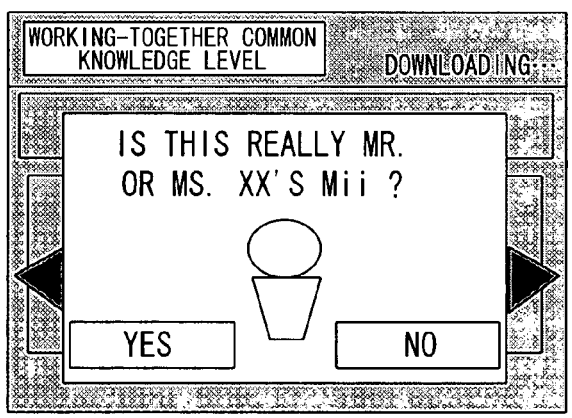
FIG. 16 is a diagram showing an exemplary screen of the quiz game assumed in this embodiment.
Figure 17:
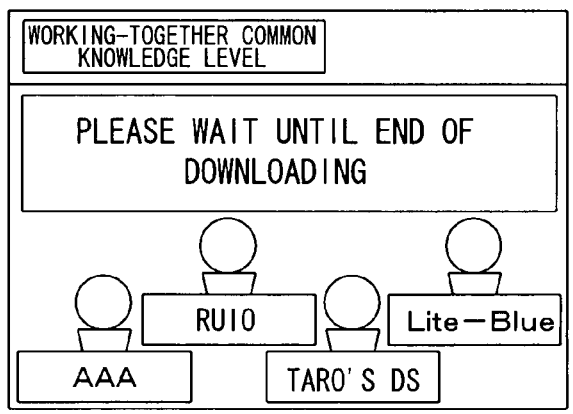
FIG. 17 is a diagram showing an exemplary screen of the quiz game assumed in this embodiment.

FIG. 15 shows a M11 select screen. When the download button 102 is pressed, the Mii select screen is displayed. In this screen, a message 103 indicating whose Mii is to be selected is displayed slightly above a middle of the screen. Also, a Mii display area 104 is provided in substantially a lower half of the screen, in which a plurality of Miis are displayed. A player performs an operation of selecting a desired Mii from these displayed Miis using the controller 7. After that, as shown in FIG. 16, a screen for confirming a selected Mii is displayed. In the screen of FIG. 16, two buttons "YES" and "NO" are displayed. If "YES" is selected, the selected Mii is confirmed. If "NO" is selected, the select screen of FIG. 15 is displayed again. After Miis are determined for all the players by repeating this selecting process a number of times corresponding to the number of the players, a screen as shown in FIG. 17 is displayed until the transmission/reception of the answer program is completed. In FIG. 17, the selected Miis for the players are displayed together with the respective corresponding DS names.

Figure 18:
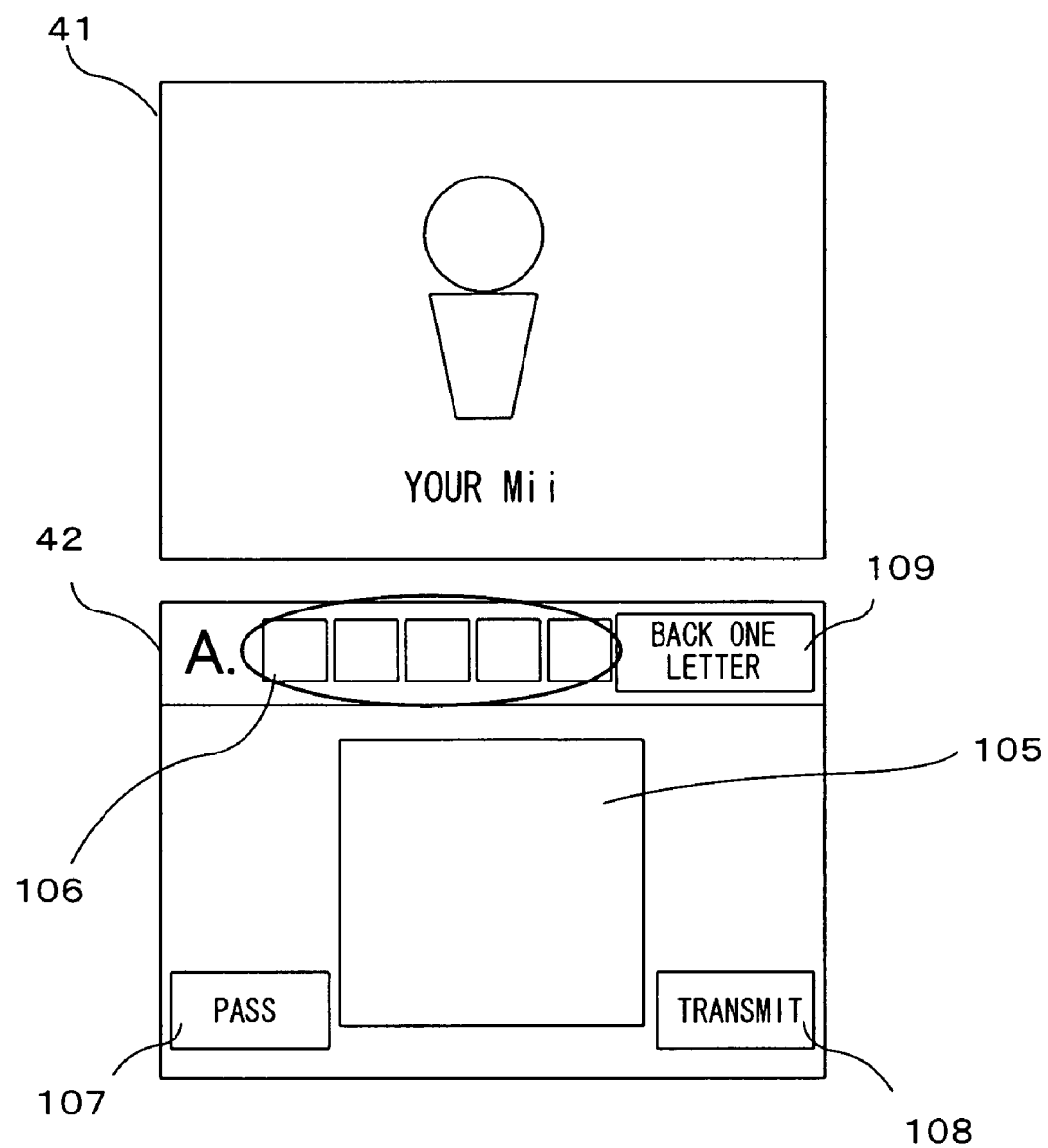
FIG. 18 is a diagram showing an exemplary screen of the quiz game assumed in this embodiment.

In the DS, if the reception of the answer program is completed, the answer program is executed. FIG. 18 shows an exemplary screen of the answer program executed in the DS. In FIG. 18, the Mii selected by the player is displayed on the first LCD 41. Also, a screen for inputting an answer is displayed on the second LCD 42. In the answer input screen, a handwriting input area 105, a recognized letter display area 106, a pass button 107, a transmission button 108, and a return button 109 are displayed. Here, this screen will be briefly described. The handwriting input area 105 is an area where a letter is hand-written using the stylus pen 46. The answer input screen is in a state in which the screen is hatched and a letter cannot be input, before a question is started or after an answer is transmitted. The recognized letter display area 106 is an area where a letter is displayed which has been recognized as a result of a letter recognition process performed with respect to a letter written in the handwriting input area 105. Note that, when it is necessary to input a plurality of letters so as to answer a question, the letters are written one by one in the handwriting input area 105 and are recognized one by one. The pass button 107 is a button which a player uses to pass without answering. The transmission button 108 is a button for transmitting a recognized letter (a letter displayed in the recognized letter display area 106) as an answer to the Wii. The return button 109 is a button for modifying an answer. If this button is pressed, an answer (one letter) is deleted from the screen. The outline of the preparation process has heretofore been described.

Figure 19:
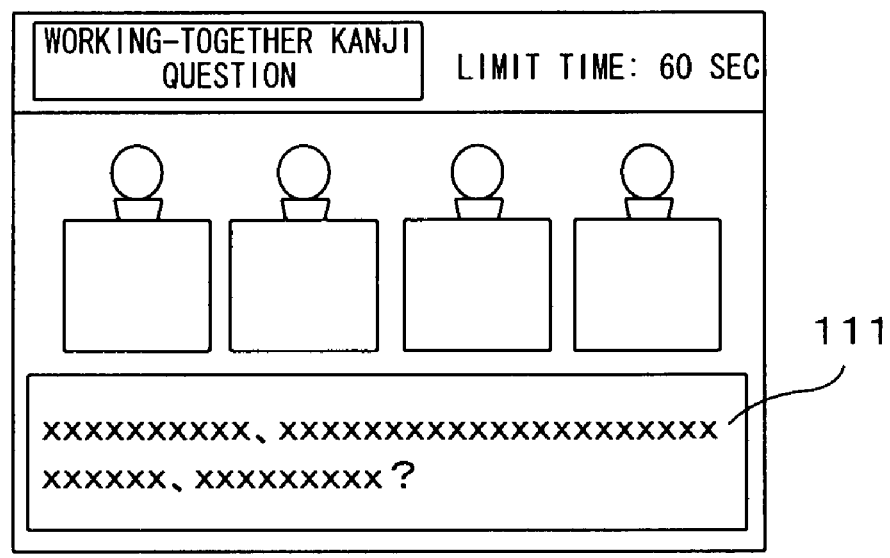
FIG. 19 is a diagram showing an exemplary screen of the quiz game assumed in this embodiment.

Next, an output of the game process in steps S5 and S6 of FIG. 11 will be described. Initially, a "question" is displayed on the Wii's screen, i.e., the television 2. FIG. 19 shows an exemplary display screen of the "question". In FIG. 19, the Miis representing the players are displayed in substantially an upper half of the screen of the television 2 (an image of a quiz program set), and a question text 111 is displayed in substantially a lower half of the screen. Here, in this embodiment, the "question" is answered in a plurality of manners which are previously prepared. For example, a question is answered by the four players in corporation with each other; the four players compete with each other on the speed of answering a question; and the four players independently answer the question like an ordinary quiz. Here, the answering manner in which the four players work together will be described. Note that this manner is hereinafter referred to as a "working together" manner. Specifically, the four players each input a handwritten KANJI letter (Chinese letter) using the question text 111 as a clue to complete a four-letter idiom (an idiom consisting of four KANJI letters). As an example, the question is to complete a certain four-letter idiom consisting of four KANJI letters meaning "wind", "forest", "fire", and "mountain" (the idiom means "swift as the wind, silent as a forest, fierce as fire, and immovable as a mountain" (a famous Japanese warload's flag slogan)) by the four players. If these four KANJI letters are correctly input by four players, respectively, the answer is correct. More specifically, if a player 1 inputs a KANJI letter meaning "wind" (a KANJI letter displayed in an area 113a of FIG. 21 described below), a player 2 inputs a KANJI letter meaning "forest" (not shown), a player 3 inputs a KANJI letter meaning "fire" (a KANJI letter displayed in an area 113c of FIG. 21 described below), and a player 4 inputs a KANJI letter meaning "mountain" (a KANJI letter displayed in an area 113d of FIG. 21 described below), each letter is determined to be correct. Also, there is a limit on a time required to answer.

When the question text 111 is displayed on the television 2 as shown in FIG. 19, each player inputs an answer using his/her DS. The "question" which is described as an example in this embodiment is a question in which each player is asked to write a KANJI letter. Therefore, each player writes a letter in the handwriting input area 105 (i.e., on the second LCD 42 on which the touch panel 45 is attached) of FIG. 18 using the stylus pen 46 (i.e., "handwriting input"). Writing strokes by each player are displayed in real time in the handwriting input area 105. Also, in this case, a series of touch coordinates of the input are successively transmitted as stroke data from the DSs to the Wii. In the Wii, the stroke data is stored for each player (each DS as a transmission source).

Figure 20:
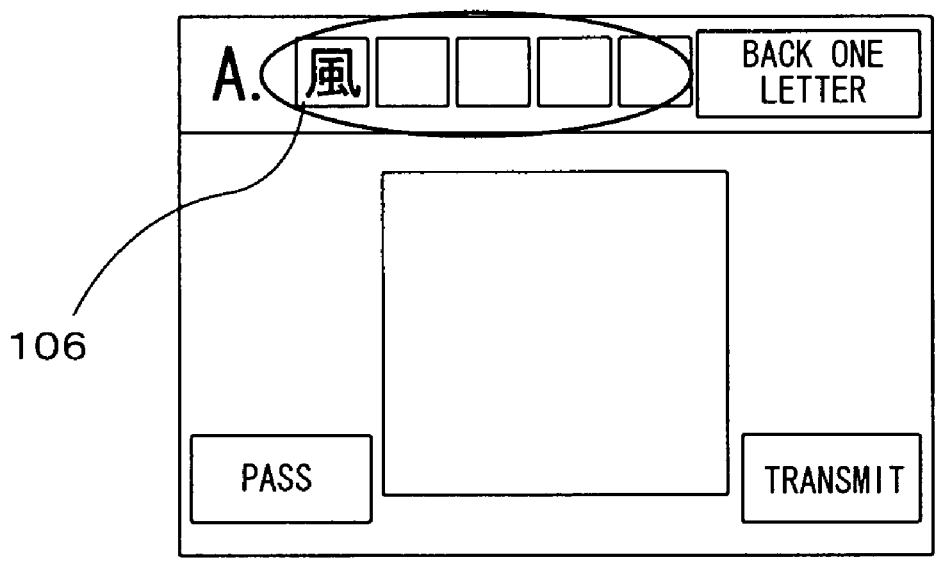
FIG. 20 is a diagram showing an exemplary screen of the quiz game assumed in this embodiment.

After the inputting of a letter is finished, a letter recognition process is performed in the DS. Specifically, when the player finishes inputting a series of handwriting inputs, the player removes the stylus pen 46 from the touch panel 45 (touch-off operation). Thereafter, when a predetermined time has passed, the resultant handwriting in the handwriting input area 105 is subjected to letter recognition. Thereafter, the result of the recognition is displayed in the recognized letter display area 106 as shown in FIG. 20. The displayed letter is of a predetermined font. In other words, the handwritten letter is shaped and displayed in the recognized letter display area 106.

Figure 21:
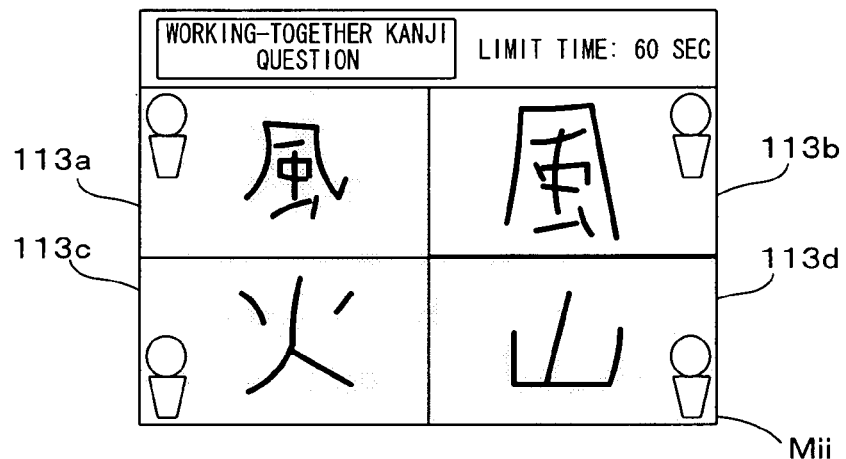
FIG. 21 is a diagram showing an exemplary screen of the quiz game assumed in this embodiment.

Thereafter, when a limit time for answering has passed, the results of the answers are displayed on the television 2. FIG. 21 shows an exemplary screen on which the results of the answers are displayed. In FIG. 21, the screen (excluding an upper portion) is divided into four quadrangular areas 113a to 113d. The areas 113a to 113d correspond to the respective players. The Miis of the players are displayed, corresponding to the respective areas 113a to 113d. Specifically, each Mii is displayed at a corner of the corresponding area. The areas 113a to 113d also display handwritings which were written by the players and are reproduced based on the stroke data received from the players. Also, the background color of each of the areas 113a to 113d is changed, if the area corresponds to a player having a correct answer. In FIG. 21, only a player corresponding to the upper right area 113b has a wrong answer.

Figure 22:
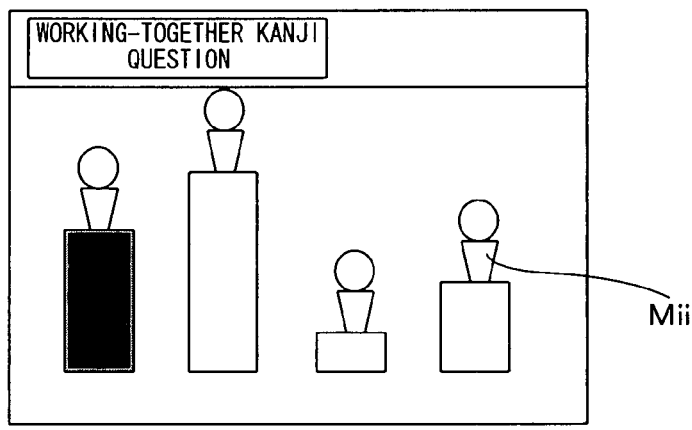
FIG. 22 is a diagram showing an exemplary screen of the quiz game assumed in this embodiment.
Figure 23:
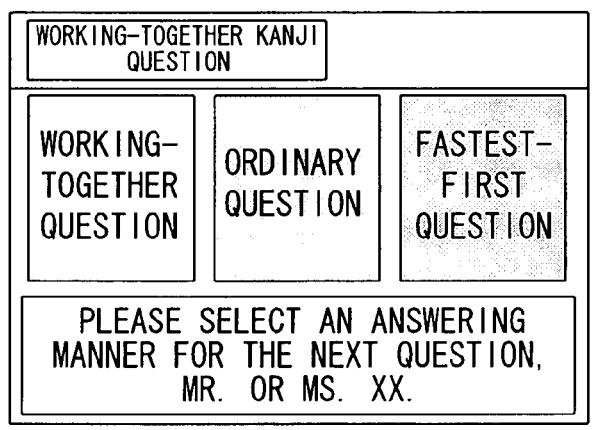
FIG. 23 is a diagram showing an exemplary screen of the quiz game assumed in this embodiment.

The next question is asked when a predetermined time has passed after the results of the answers were displayed, or depending on a player's operation, so that the quiz game is continued. When a predetermined number of questions have been asked and answered (e.g., when a round is assumed to include five questions, five questions have been asked and answered), a final result screen is displayed as shown in FIG. 22. In FIG. 22, the results of the players are displayed as a bar chart. The Miis of the players are displayed, sitting on respective corresponding bars. Thereafter, when the game is continued, an answering manner select screen for the next question is displayed as shown in FIG. 23. In this screen, a player having the best result can select an answering manner for the next question. The outline of the game process has heretofore been described.

Next, an outline of the post-process in step S7 of FIG. 11 will be described. In this process, when the quiz game is ended, a process of saving the result of the quiz game as save data into the Wii is performed. The save data includes a history of answers of each player (e.g., the percentage of questions answered correctly, information about questions often answered incorrectly, etc.) in association with the Miis selected by the players.

Thus, by causing the DS to execute the letter recognition process and return only the recognition result, the processing load of the Wii can be reduced as compared to when the letter recognition process is performed in the Wii. In addition, the amount of communication between the Wii and the DS can be reduced. As a result, the processing speed of the whole game process can be increased.

Figure 24:
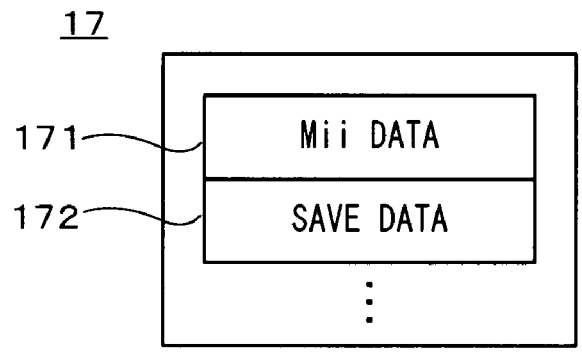
FIG. 24 is a diagram showing a memory map of a flash memory 17 of FIG. 3.

Next, various kinds of data used in this embodiment will be described. Firstly, data related to the stationary game apparatus 3 (Wii) will be described. FIG. 24 is a diagram showing a memory map of the flash memory 17 of FIG. 3. Since the flash memory 17 is a non-volatile memory as described above, data described below is not erased and continues to be stored even when the stationary game apparatus 3 is powered OFF. In FIG. 24, the flash memory 17 includes Mii data 171 and save data 172. Note that these pieces of data may be transferred to and stored in the external main memory 12 during execution of a game program. Although each piece of data is described as table data for the sake of simplicity, the data may not be stored in the form of table data, and a process equivalent to the contents of the table may be stored in a game program.

Figure 25:
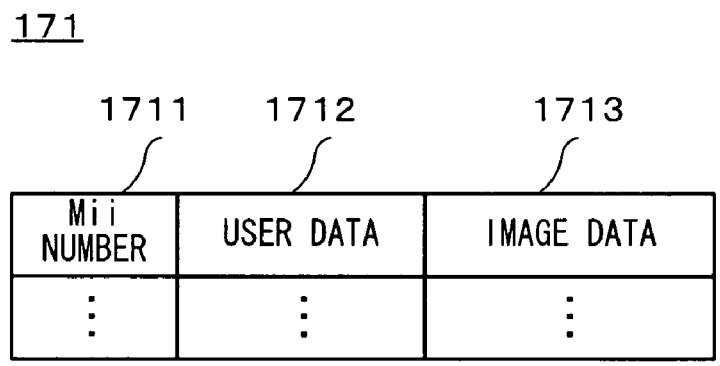
FIG. 25 is a diagram showing an exemplary structure of Mii data 171.

FIG. 25 is a diagram showing an exemplary structure of the Mii data 171. The Mii data 171 includes sets of a Mii number 1711, user data 1712, and image data 1713. The Mii number 1711 is an identification number for uniquely identifying a Mii. The user data 1712 is information about a player corresponding to the Mii (e.g., name, age, sex, etc.). The image data 1713 is data about an image of the Mii displayed on a screen (e.g., texture data, etc.).

Figure 26:
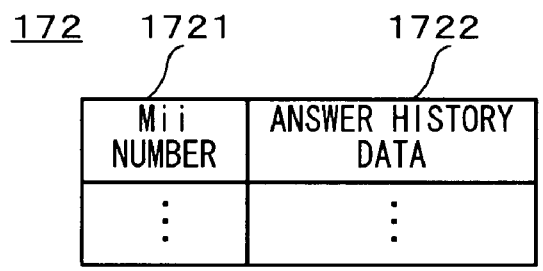
FIG. 26 is a diagram showing an exemplary structure of save data 172.

FIG. 26 is a diagram showing an exemplary structure of the save data 172. The save data 172 includes sets of a Mii number 1721 and answer history data 1722. The Mii number 1721 is data corresponding to the Mii number 1711 in the Mii data 171. The answer history data 1722 is data about the details or results of answers of a player using a Mii corresponding to the Mii number 1721 (question numbers, the percentage of questions which a player has answered correctly, the percentage of questions which a player has won, etc.).

Figures 27, 28:
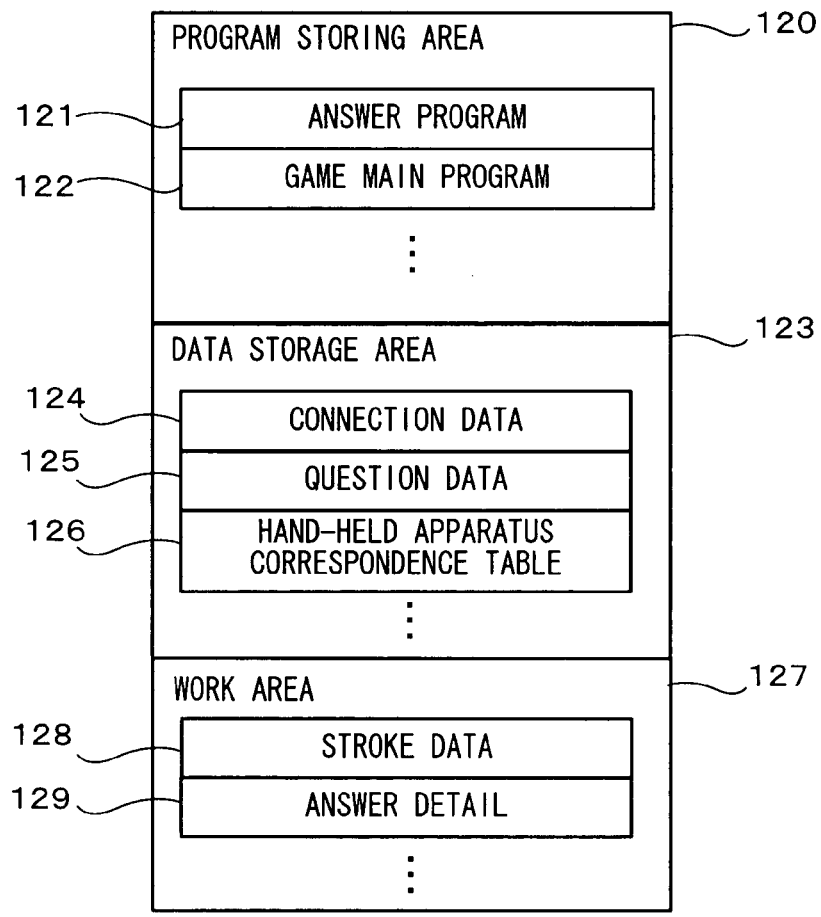
FIG. 27 is a diagram showing a memory map of an external main memory 12 of FIG. 3.
FIG. 28 is a diagram showing an exemplary data structure of question data 125.

FIG. 27 is a diagram showing a memory map of the external main memory 12 of FIG. 3 (note that the internal main memory 11e may be used, or both the memories may be used). In FIG. 27, the external main memory 12 includes a program storage area 120, a data storage area 123, and a work area 127. Data in the program storage area 120 and the data storage area 123 is data which is previously stored in the disc 4 and is copied into the external main memory 12 during a quiz game process.

Figure 34:
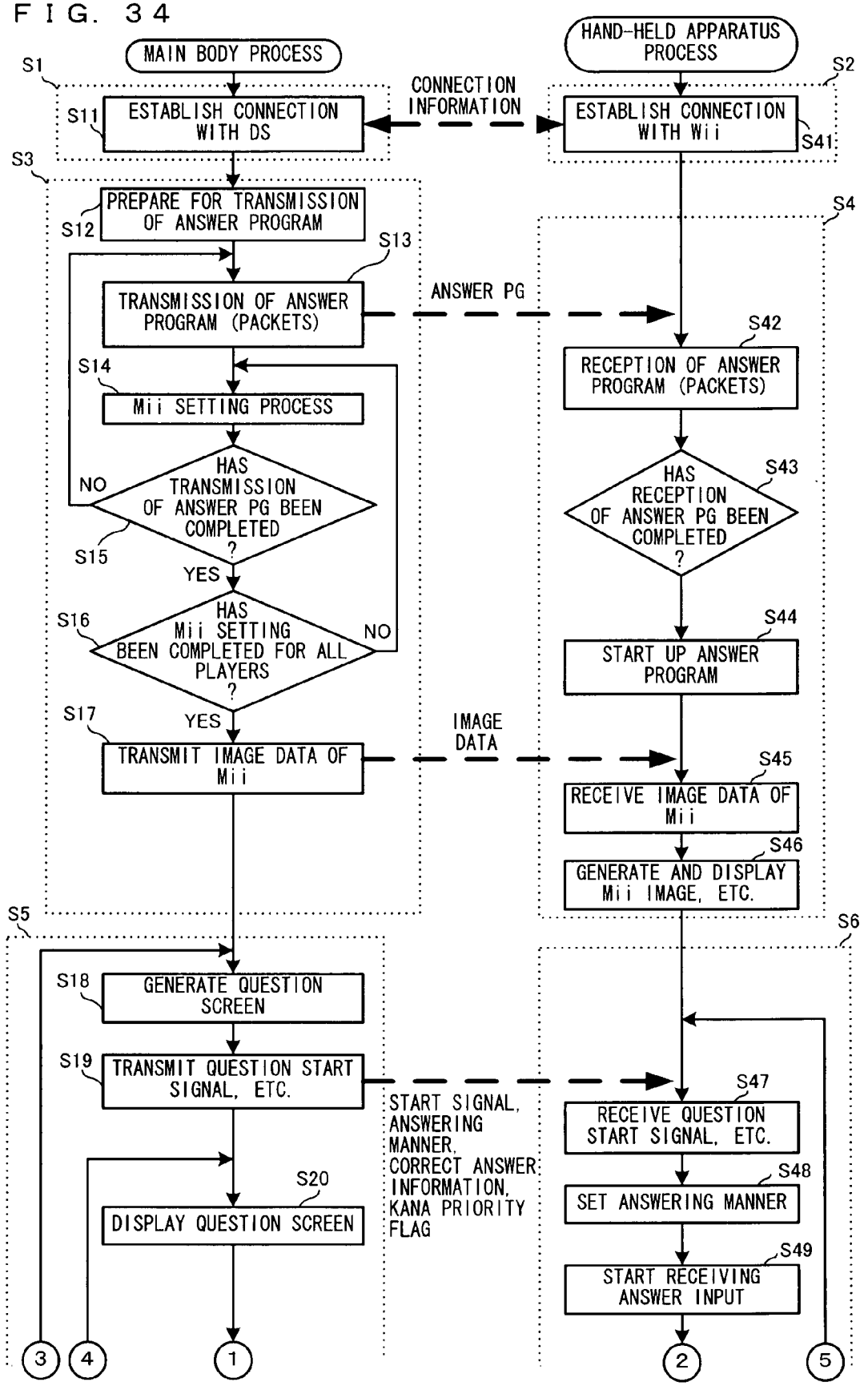
FIG. 34 is a flowchart showing a detail quiz game process according to the embodiment.
Figure 35:
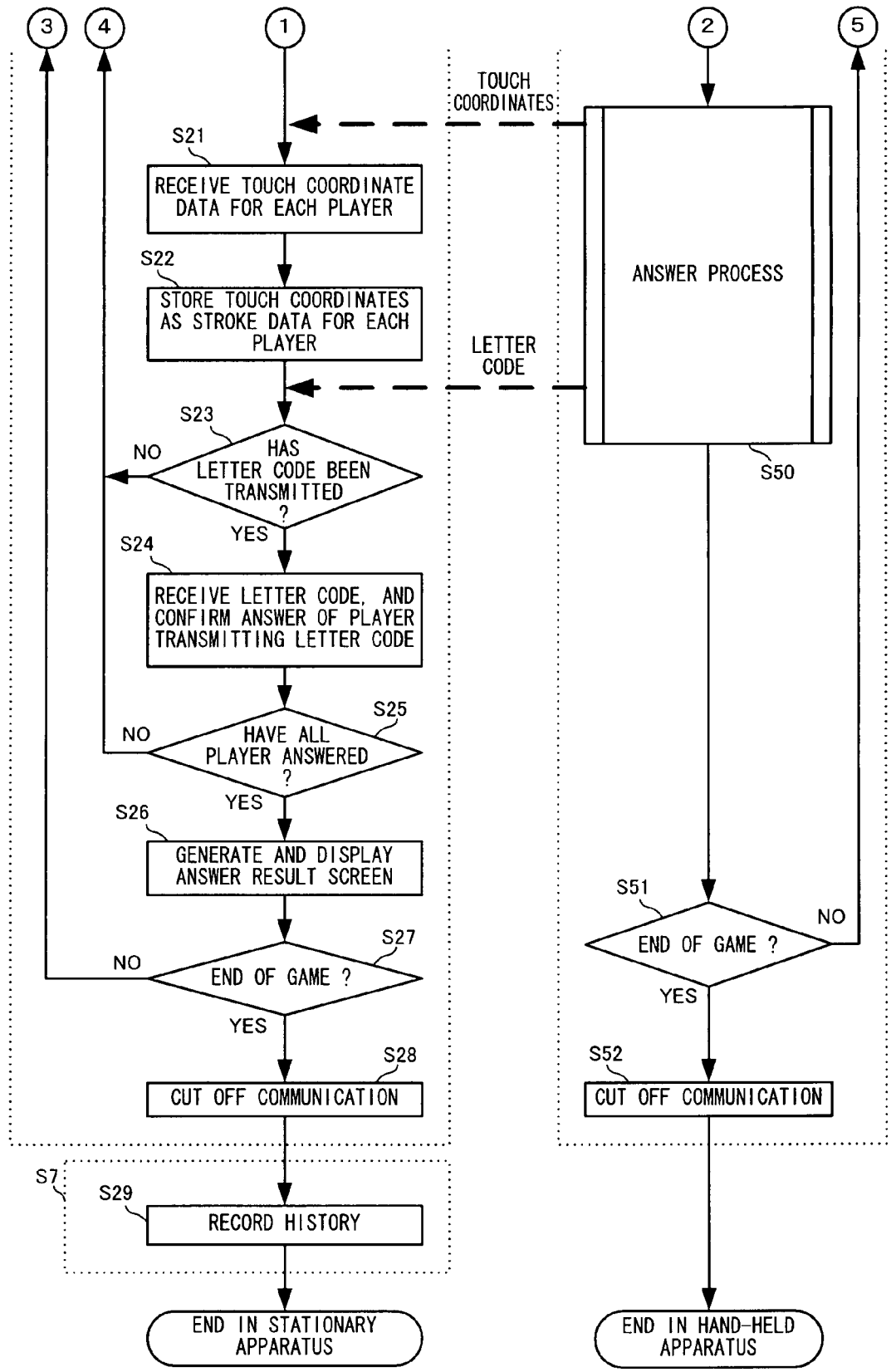
FIG. 35 is a flowchart showing a detailed quiz game process according to the embodiment.
Figure 36:
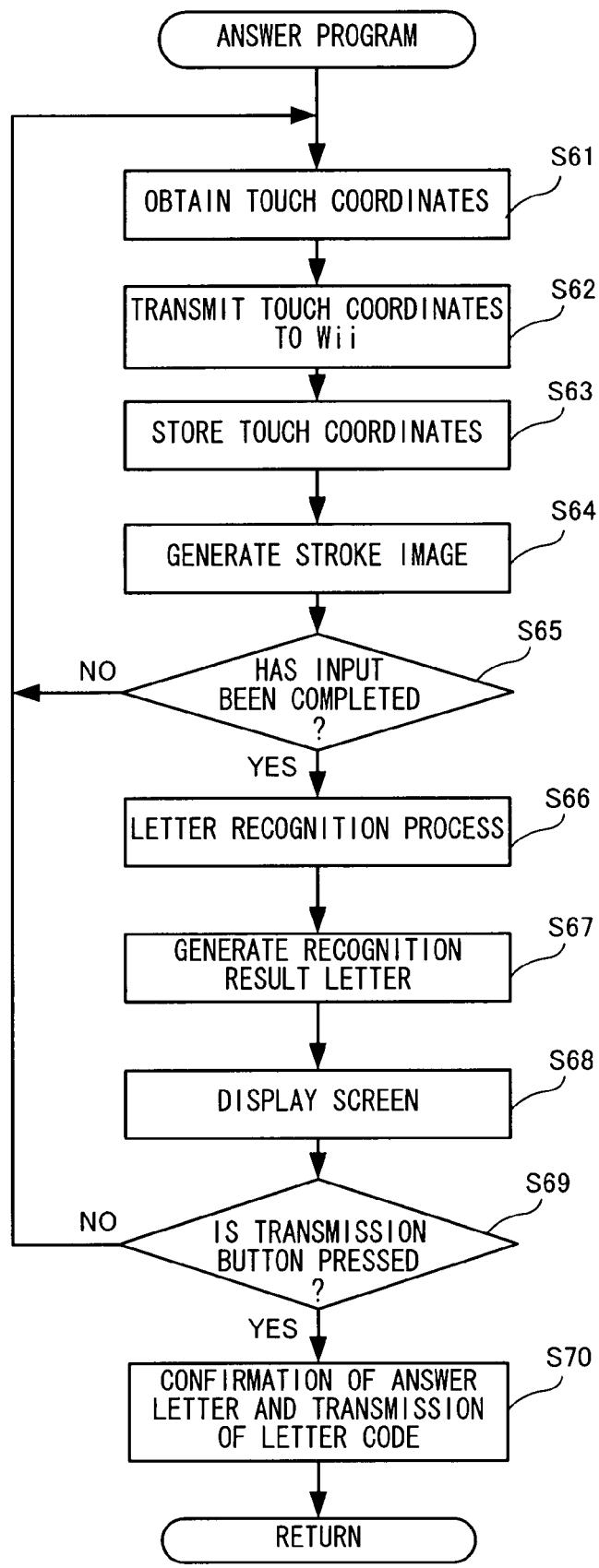
FIG. 36 is a flowchart showing a detailed answer process in step S50 of FIG. 35.

The program storage area 120 stores an answer program 121 to be transmitted to the DSs, a game main program 122 for performing processes of flowcharts of FIGS. 34 to 36 described below using the CPU 10, and the like. In addition, various programs required for a game process, a communications process and the like are stored (not shown).

The data storage area 123 stores connection data 124, question data 125, and a hand-held apparatus correspondence table 126. The connection data 124 is various pieces of information for establishing connection with the DSs. The question data 125 is data about "questions" asked in a quiz game. The hand-held apparatus correspondence table 126 is information about connection relationships with the DSs.

The work area 127 stores stroke data 128 and answer details 129. The stroke data 128 is data for reproducing a handwriting which is input by each player writing by hand. Touch coordinate data which is transmitted from the DSs on a frame-by-frame basis is stored as the stroke data 128 (a series of writing strokes by hand). The answer details 129 are the details and the like of answers of the players in the quiz game process of this embodiment, and the like.

FIG. 28 is a diagram showing an exemplary data structure of the question data 125. The question data 125 includes sets of a question number 1251, an answering manner 1252, a question text 1253, correct answer information 1254, and a KANA priority flag 1255. The question number 1251 is an identification number for uniquely identifying a "question" asked in the quiz game of this embodiment. The answering manner 1252 is data for indicating an answering manner for the "question" as described above. In this embodiment, there are three answering manners, "working together", "fastest first", and "ordinary". The question text 1253 is data of a question text of the "question". The correct answer information 1254 is data of a correct answer for the questions. The KANA priority flag 1255 is a flag for causing only HIRAGANA and KATAKANA letters to be recognized by a letter recognition process in the DSs (i.e., KANJI letters are not recognized). For example, in the case of a question in which only HIRAGANA or KATAKANA letters are written, the flag is set to be YES. In other questions, the flag is set to be NO.

FIG. 29 is a diagram showing an exemplary data structure of the hand-held apparatus correspondence table 126. The hand-held apparatus correspondence table 126 includes sets of a Mii number 1261, a DS number 1262, a DS address 1263, a port number 1264, and a DS name 1265. The Mii number 1261 is data corresponding to the Mii number 1711 of the Mii data 171. The DS number 1262 is an identification number assigned to identify a DS which has established connection with the Wii. The DS address 1263 is a network address of the DS which has established the connection. The port number 1264 is a port number which is used to communicate with the DS which has established the connection. The DS name 1265 is the name of the DS which is previously set for the DS itself. The name may be previously set by the user or may be fixed.

A portion (a) of FIG. 30 is a diagram showing an exemplary data structure of the stroke data 128. The stroke data 128 includes sets of a DS number 1281 and coordinate data 1282. The DS number 1281 is data corresponding to the DS number 1262 of the hand-held apparatus correspondence table 126. The coordinate data 1282 stores touch coordinate data which is transmitted on a frame-by-frame basis from a DS. A portion (b) of FIG. 30 is a diagram showing an exemplary data structure of the coordinate data 1282. The coordinate data 1282 stores a history of touch coordinates of a series of handwritten strokes. In the portion (b) of FIG. 30, touch coordinate points are stored in order of time (earliest first). Also, a control code (here represented by "@") is stored which is a delimiter of a series of inputs.

FIG. 31 is a diagram showing an exemplary data structure of the answer detail 129. The answer detail 129 includes a DS number 1291, a recognized letter code 1292, and an answer history 1293. The DS number 1291 is data corresponding to the DS number 1262 of the hand-held apparatus correspondence table 126. The recognized letter code 1292 is data which stores a letter code transmitted from a DS and is used to determine whether or not an answer is correct. The answer history 1293 is data which shows the result of an answer for each asked question and is to be finally saved into the save data 172. The answer history 1293 includes sets of a question number 1294 and an answer result 1295. The question number 1294 is a number corresponding to the question number 1251 of the question data 125. The answer result 1295 is data which indicates the result of an answer for the question (e.g., whether the answer is correct or incorrect).

Figure 32:
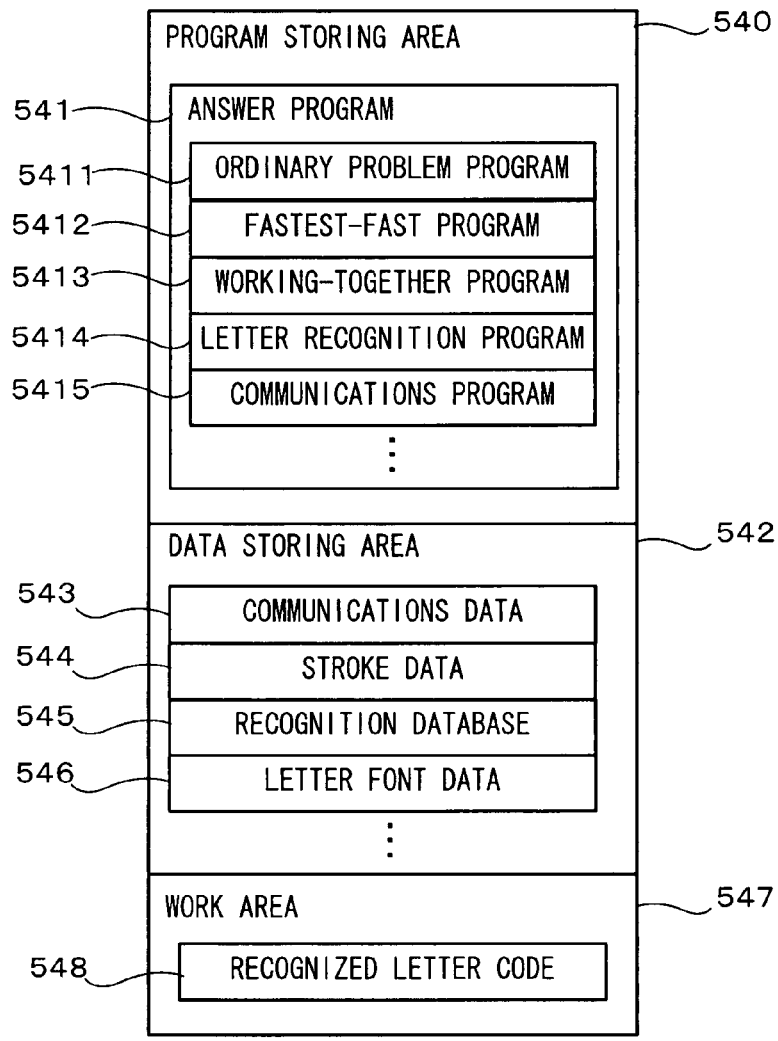
FIG. 32 is a diagram showing a memory map of a RAM 54 of FIG. 10.

Next, data related to the hand-held game apparatus 40 (DS) will be described. FIG. 32 is a diagram showing a memory map of the RAM 54 of FIG. 10. In FIG. 32, the RAM 54 includes a program storage area 540, a data storage area 542, and a work area 547.

The program storage area 540 stores an answer program 541 transmitted from the Wii, for example. The answer program 541 includes an ordinary program 5411, a fastest-first question program 5412, a working-together question program 5413, a letter recognition program 5414, a communications program 5415, and the like. The ordinary program 5411, the fastest-first question program 5412, and the working-together question program 5413 are answer programs corresponding to the respective question answering manners. The letter recognition program 5414 is a program for recognizing a letter input by a player writing by hand on the DS. The communications program 5415 is a program for transmitting and receiving various data to and from the Wii in the quiz game of this embodiment. In addition, various programs required for a game process and the like are stored (not shown).

Figure 33:
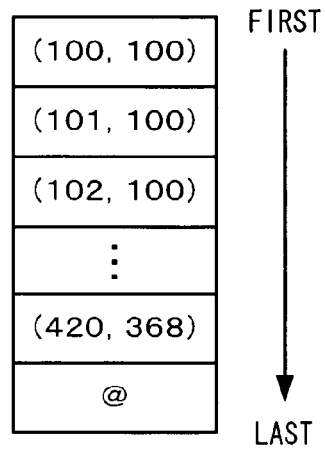
FIG. 33 is a diagram showing an exemplary data structure of stroke data 544.

The data storage area 542 stores communications data 543, stroke data 544, recognition database 545, and letter font data 546. The communications data 543 is data which is used for communication with the Wii in the game, and stores information about a network address of the Wii, a port number, and the like. The stroke data 544 is data which shows writing strokes input by a player writing by hand. This data is a set of touch coordinates as shown in FIG. 33. The recognition database 545 is a database which is used in pattern matching of the letter recognition process. The letter font data 546 is data of letter fonts.

The work area 547 stores a recognized letter code 548. The recognized letter code 548 is a letter code which represents a letter as a result of letter recognition with respect to a letter input by a player writing by hand. In this embodiment, shift JIS KANJI codes are used.

Hereinafter, an operation of the quiz game process of this embodiment will be described in detail with reference to FIGS. 34 to 36. In the following description, a DS-side process is executed in each of the DSs. When the Wii (the stationary game apparatus 3) is powered ON, the CPU 10 of the Wii executes the boot program stored in the ROM/RTC 13 to initialize each unit, such as the external main memory 12 and the like. Thereafter, a quiz game program stored in the optical disc 4 is read out into the external main memory 12. Execution of the game program is started by the CPU 10. The flowcharts of FIGS. 34 and 35 show a quiz game process performed after the above-described processes are completed. Note that the process loop of FIGS. 34 and 35 is repeatedly executed in units of flames (1/60 sec) in both the Wii and the DS.

Firstly, the connection process in steps 51 and S2 of FIG. 11 will be described in detail. When the quiz game is started up and the multiplayer game mode is selected by a player's operation, a process for selecting the number of players is executed. Thereafter, a process for establishing between the DSs and a network is executed (step S11). More specifically, a screen for indicating connection statuses as shown in FIG. 13 is generated and displayed on the television 2. Thereafter, a process of waiting for connection request signals from the DSs while regularly emitting a beacon, is started.

Each player holding the DS view the connection status screen displayed on the television 2, starts up his/her DS, and selects the "download mode" as described above. Thereby, in the DS, a process for establishing network communication with the Wii is executed (step S41). The process of step S41 will be described in more detail. Firstly, a process of searching for a communication party is executed. As a result, the beacon emitted from the Wii is found and the Wii is recognized as a connection target. Next, the DS transmits a connection request signal including a network address and the like thereof to the Wii.

The Wii, which has received the connection request from the DSs, stores the network addresses of the DSs included in the connection requests at the DS addresses 1263 in the hand-held apparatus correspondence table 126. In this case, the DS numbers 1262 are appropriately assigned and stored (e.g., 1, 2, 3, . . . in order of time (earliest first)). Also, port numbers used for communication with the DSs are separately set, and the port numbers thus set are stored as the port numbers 1264. Next, the Wii transmits to each DS a connection acknowledgement signal, a port number, a connection request signal (from the Wii to the DS), and the like.

The DS, which has received the connection acknowledgement signal, the port number, the connection request signal and the like from the Wii, stores the network address of the Wii and the received port number as the communications data 543 into the RAM 54. Thereafter, the DS transmits a connection acknowledgement signal to the Wii. When this connection acknowledgement signal is received by the Wii, connection is established between the DS and the Wii.

Next, the Wii transmits to the DS a signal for requesting the name of the DS (i.e., a "DS name") which is previously set in the DS main body. In response to this, the DS transmits the "DS name" set in itself to the Wii. The Wii receives and stores the "DS name" as the DS name 1265 into the hand-held apparatus correspondence table 126. Thereafter, the DS name is displayed on a screen to indicate establishment of connection. Specifically, as shown in FIG. 14, the "DS name" of the DS is delayed in the DS name area 101 of the connection status screen.

Next, the preparation process of step S3 of FIG. 11 will be described in detail. When connection has been established with DSs the number of which is equal to the number of players and an operation of pressing the download button 102 is performed on the connection status screen in the Wii, the Wii transmits an answer program. In this case, it takes a predetermined time to complete the transmission. Therefore, by utilizing the waiting time until the transmission is completed, a process of selecting a Mii (hereinafter referred to as a Mii selecting process) as described with reference to FIGS. 15 to 17 is performed. Note that the answer program transmitting process and the Mii selecting process are executed in a so-called multitasking manner. Specifically, the processing time of the CPU 10 is divided into considerably short units, which are sequentially assigned to a plurality of processes, thereby apparently executing the processes simultaneously.

Initially, the answer program 121 is read out from the external main memory 12. Next, the answer program 121 is divided into units each having a predetermined size (a predetermined number of bits), and a predetermined header or the like is added to each unit, to generate a transmission packet (step S12).

Next, a process of transmitting a packet of data is executed (step S13). Note that some packets may be simultaneously transmitted. As a result, the answer program is transmitted in packets to the DS.

Next, the Mii selecting process as described in FIGS. 15 to 17 is executed (step S14). Specifically, selection of a Mii and various determination processes based on a player's operation, the processes of generating and displaying screens as shown in FIGS. 15 to 17, and the like are performed. Thereafter, it is determined whether or not the transmission of the answer program has been completed (step S15). For example, it is determined whether or not all packets to be transmitted have been transmitted and a signal indicating the completion of reception has been received from all the DSs. As a result, when the transmission of the answer program has not been completed (NO in step S15), the flow returns to the process of step S12, and a packet to be next transmitted is transmitted, and further, the Mii selecting process is executed. Here, since these processes are executed as a multitask as described above, it seems to the player that the Mii selecting process is executed while the answer program is being transmitted and received on the background.

On the other hand, if the transmission of the answer program has been completed (YES in step S15), then it is determined whether or not Miis the number of which is equal to the number of players have been selected (step S16). If not all Miis the number of which is equal to the number of players have yet been selected (NO in step S16), the flow returns to the process of step S14, and the Mii selecting process is executed. On the other hand, if Miis the number of which is equal to the number of players have been selected (YES in step S16), the Mii data 171 in the flash memory 17 is accessed. Based on the Mii numbers 1711 of the selected Miis, the pieces of image data 1713 of the Miis are read out. The pieces of image data 1713 are transmitted to the respective corresponding DSs (step S17).

Next, the preparation process of step S4 of FIG. 11 executed in the DSs will be described in detail. When the answer program is transmitted in packets by the Wii in step S12, the DSs receive and store the packets (step S42). Next, it is determined whether or not the reception of the answer program has been completed (step S43). If the reception has not yet been completed (NO in step S43), the flow returns to the process of step S42, and a packet next transmitted is received. On the other hand, if the reception has been completed (YES in step S43), the DS transmits a signal indicating the completion of the reception to the Wii. Thereafter, the answer program is expanded in the RAM 54 and is started up (step S44). If the answer program is started up, the image data of the Mii transmitted from the Wii is initially received by the communications program 5415 included in the program (step S45).

Next, the received image data is stored into the RAM 54, and an image of the Mii is generated based on the image data. In addition, an image for inputting an answer is generated based on data included in the received answer program. Thereafter, as shown in FIG. 18, the Mii image is displayed on the first LCD 41, while the answer input image is displayed on the second LCD 42 (step S46). Note that, at this time, the handwriting input area 105 is hatched, so that a player cannot yet input.

Next, the game process in the Wii of step S5 of FIG. 11 will be described in detail. Initially, a process of generating a question display screen (see FIG. 18) is executed (step S18). More specifically, initially, a predetermined question number 1251 is randomly selected from the question data 125, and the corresponding question text 1253 is read out (if the answering manner 1252 is designated by a player, the question text 1253 is selected based on the designated answering manner 1252). Next, a question display image is generated in the VRAM 11d based on the read question text 1253 (see FIG. 19). In addition, the work area 127 of the Wii is initialized. It is here assumed that a "working-together" question (the question is answered by the four players in cooperation with each other; the four players each input one letter to complete a four-letter idiom consisting of four KANJI letters meaning "wind", "forest", "fire", and "mountain") is selected and asked.

Next, a question start signal and the like are transmitted (step S19). More specifically, the answering manner 1252, the correct answer information 1254, and the KANA priority flag 1255 which correspond to question data selected in step S18, are read out from the external main memory 12. Next, these pieces of read data are transmitted to each DS along with a start signal indicating the start of the question. Thereafter, the generated question display image is displayed on a screen. In addition, the countdown of the limit time is started (step S20).

Next, touch coordinates or a control code indicating a delimiter of strokes (here represented by "@"), which are transmitted from the DSs, are received for each DS (step S21).

Next, the received touch coordinates are successively stored as stroke data of the respective corresponding DSs (step S22). More specifically, initially, when touch coordinates are received, it is determined to which port number the touch coordinates are transmitted, in other words, at which port number the touch coordinates are received. Next, the DS number 1262 corresponding to the received port number 1264 is read out from the hand-held apparatus correspondence table 126. Thereafter, the stroke data 128 is accessed to search for data corresponding to the DS number 1262. Thereafter, the received touch coordinates are successively stored as the coordinate data 1282 corresponding to the retrieved DS number 1281. Note that it may be determined which DS has transmitted data, based on the network address of the transmission source (i.e., the DS address 1263).

Next, it is determined whether or not a recognized letter code has been transmitted from any DS (step S23). The recognized letter code refers to a letter code indicating the result of recognition of a handwritten input letter on a DS. Also, the determination is performed based on, for example, whether or not a predetermined flag is set in the header of a packet transmitted from a DS. Note that, in this embodiment, shift JIS codes are used as the letter codes as described above.

When the result of the determination in step S23 is that a recognized letter code has not been transmitted (NO in step S23), the flow returns to the process of step S20. On the other hand, when it is determined that a recognized letter code has been transmitted (YES in step S23), the recognized letter code is received. Thereafter, the answer detail 129 in the work area 127 is accessed and is stored as the recognized letter code 1292 corresponding to the DS number 1291 of the transmission source (step S24). Thereby, an answer is confirmed for a DS which is the transmission source of the recognized letter code.

Next, it is determined whether or not answers of all players have been confirmed (the number of answers is equal to the number of players) (step S25). For example, this is based on whether or not the answer details 129 of all the players have been stored. As a result, if not all the answers of the players have been confirmed (NO in step S25), the flow returns to the process of step S20.

On the other hand, if all the answers of the players have been confirmed (YES in step S25), images of the results of the answers are generated and displayed (step S26). The process of step S26 will be described in more detail. Initially, the recognized letter code 1292 is read out from the answer detail 129 for each DS number 1291 (i.e., each player). Next, for each DS, it is determined whether the answer is correct or incorrect with reference to the correct answer information 1254. Next, for each DS, the stroke data 128 is referenced, and based on the DS number 1281, the coordinate data 1282 is read out. Next, for each DS, an image which reproduces a handwriting input the player on the DS is generated based on the coordinate data 1282. Thereafter, an answer result image (see FIG. 21) in which the handwriting images are placed in the areas 113*a* to 113*d* corresponding to the respective DSs, is generated in the VRAM 11*d*. For example, the handwriting of a player corresponding to the DS number (1) is placed in the upper left area 113*a* of FIG. 21. In this case, in order to clearly see whether an answer is correct or incorrect, the background color of an area in which a handwriting image is displayed is appropriately changed. In addition, the image data 1713 of a Mii corresponding to each DS number is read out from the Mii data 171. As shown in FIG. 21, the Mii images are placed in corners of the respective areas 113*a* to 113*d* corresponding to the respective DSs. The answer result image is displayed on the television 2. Thereafter, by a player performing a predetermined input operation, an overall result display image as described with reference to FIG. 22 is generated and displayed on the television 2. Note that, here, only one letter is an answer, so that a handwriting image also shows only one letter. If an answer includes a plurality of letters, every time a control code "@" indicating a stroke delimiter is read out, a display position of each letter (writing strokes) is appropriately shifted to generate an answer result screen. Also, in this case, in order to prepare for a process of saving an answer history described below into the flash memory 17 (step S29), information about the question number of the currently asked question and the results of the answers of the players (information about whether the answer is correct or incorrect answer, etc.) are stored as the answer history 1293.

Next, it is determined whether or not the game is ended (step S27). For example, it is determined whether or not the game is ended, based on whether a predetermined number of questions have been asked, or whether or not a player has issued an end command using a predetermined input operation. As a result, when it is determined that the game is not ended (NO in step S27), the flow returns to the process of step S18, and the next question is asked and processes as described above are repeated. In this case, in order to prepare for the next question, the stroke data 128 and the recognized letter code 1292 are initialized. Thereafter, an image as shown in FIG. 23 is displayed on the television 2, and a player is caused to select an answering manner for the next question.

On the other hand, when it is determined that the game is ended (YES in step S27), a process of cutting off communication with the DSs is executed (step S28). Thus, the game process in the Wii of step S5 of FIG. 11 is ended.

Next, the game process in the DS of step S6 of FIG. 11 will be described in detail. Initially, the question start signal transmitted in the process of step S19 in the Wii, and the like are received by the DS (step S47). Next, an answer program is executed based on the answering manner 1252 included in the received data (step S48). More specifically, if the answering manner is "ordinary", the ordinary program 5411 is executed. If the answering manner is "fastest first", the fastest-first question program 5412 is executed. If the answering manner is "working together", the working-together question program 5413 is executed. Things which a player can input and an image displayed on the second LCD 42 (e.g., the number of letter frames in the recognized letter display area 106, etc.) vary depending on the program started up. For example, when the working-together question program 5413 is executed, only one letter can be input. When the ordinary program 5411 is started up, a plurality of letters can be input. Here, as described above, since a "working-together" question is described as an example, the working-together question program 5413 is executed. In this case, it is assumed that each player inputs only one letter.

When the working-together question program 5413 is executed, reception of an answer input is started (step S49). Specifically, a process of causing the handwriting input area 105 of FIG. 18 to receive an input (removing hatching, etc.) is executed. Thereafter, the player performs handwriting input on the touch panel 45 of his/her own DS using the stylus pen 46. Therefore, next, an answer process for performing letter recognition of the handwritten input, transmission of the answer to the Wii, and the like is executed (step S50). FIG. 36 is a flowchart showing details of the answer process of step S50. In FIG. 36, initially, a coordinate point where the player touches using the stylus pen 46 (i.e., touch coordinates) is obtained (step S61). Next, the touch coordinates are transmitted to the Wii (step S62). More specifically, the address of the Wii and a port number which has been set since the establishment of communication with the Wii are read out from the communications data 543. Thereafter, the designated address and port are added as a header to the touch coordinates, and the resultant data is transmitted in packets. In this case, a flag for indicating that the data is touch coordinates may be set in the header.

Next, the touch coordinates obtained in step S61 are successively stored as the stroke data 544 into the RAM 54 of the DS (step S63). Next, a handwriting image input by writing by hand is generated based on the stroke data 544 (step S64).

Next, it is determined whether or not handwriting input has been completed (step S65). Specifically, the determination is based on whether or not a predetermined time has passed since the stylus pen 46 was removed from the touch panel 45 (touch off). If the predetermined time has passed, it is determined that handwriting input has been completed. If it is detected that the stylus pen 46 touches the touch panel 45 before the predetermined time passes, it is determined that handwriting input has not been completed. As a result of the determination, when it is determined that handwriting input has not been completed (NO in step S65), the handwriting image generated in step S64 is displayed on the second LCD 42, and the flow returns to step S61 and the process of step S61 is repeated.

On the other hand, if it is determined that handwriting input has been completed (YES step S65), then the input letter is subjected to a letter recognition process (step S66). The process of step S66 will be described in more detail. Initially, the stroke data 544 is read out from the RAM 54. Next, pattern matching is performed between the handwriting based on the stroke data 544 and the recognition database 545 in accordance with a predetermined recognition algorithm. In this case, it is determined whether or not YES is set in the KANA priority flag 1255 received in step S47. If the KANA priority flag 1255 is YES, pattern matching is performed only for HIRAGANA or KATAKANA letters. On the other hand, if the KANA priority flag 1255 is NO, pattern matching is performed KANJI letters as well as HIRAGANA and KATAKANA letters. Thereby, if the KANA priority flag 1255 is YES, pattern matching does not need to be performed for KANJI letters, whereby the accuracy of recognition of HIRAGANA or KATAKANA letters can be increased. The KANA priority flag 1255 is applicable to a case where only a particular set of letters (e.g., alphabets, etc.) is assumed to be input. In other words, by limiting the target of recognition as required, the accuracy of recognition can be increased.

As a result of the pattern matching, a predetermined number of letters similar to the handwritten input letter are listed. In this case, a value (e.g., 100% to 0%) of the similarity of each letter to the handwriting is indicated. In principle, a letter code indicating a letter having the highest similarity (most similar letter) is obtained as a recognition result from the recognition database 545, and is stored as the recognized letter code 548 into the work area 547. Note that, in this case, based on the correct answer information 1254 transmitted in step S19 of the Wii, a letter having a shape which is similar to a correct answer to some extent is adjustably recognized as a correct answer letter. Specifically, it is assumed that a letter indicated by the correct answer information 1254 is listed as the second most similar one of the listed letters as the result of the pattern matching. In this case, the similarity value of the second most similar letter is changed into 100% or some value is added to the similarity value into 100%. As a result, the letter indicated by the correct answer information 1254 is determined to be the most similar letter. The letter code is obtained from the recognition database 545 and is stored into the work area 547. In other words, if a correct answer letter is ranked at some high level on the list, the handwritten input letter is caused to be recognized as the correct answer letter. Thereby, it is possible to prevent a letter written by the player from failing to be recognized as a letter which is intended by the player when the handwritten letter of the player has a peculiar feature, there are many letters similar to a letter which is intended by the player, or the like, so that the written letter is determined to be a wrong answer. Thereby, the letter which is intended by the player is selected as an answer. When the correct answer letter is ranked at a low level on the list or is not listed, such an adjustment is not performed. Therefore, by performing pattern matching based on the correct answer information 1254, a desired recognized letter code can be output with relative priority.

Note that the above-described letter recognition process method is only for illustrative purposes. The present invention is not limited to this. Any letter recognition process method can be used as long as letter codes can be obtained. For example, a handwriting image may be divided into a grid of 3×3 rectangles, and pattern matching may be performed by comparing corresponding rectangles.

If the letter recognition process is ended, then a font is read out from the letter font data 546 based on the letter code which is the recognition result, thereby generating a recognition result letter. Thereafter, an image including the recognition result letter is generated in the second VRAM 59 (step S67). In this case, a control code ("@") for indicating the delimiter of strokes is transmitted to the Wii. Note that the read font (recognition result letter) is placed at the leftmost position in the recognized letter display area 106. Next, a process of displaying a screen including the recognition result letter is performed (step S68). In this case, a process of clearing the handwriting input area 105 is also performed.

Next, it is determined whether or not the transmission button 108 (see FIG. 18) has been pressed (step S69). When the transmission button 108 has not been pressed (NO in step S69), the flow returns to step S61 and the process of step S61 is repeated (in the case of an answering manner in which a plurality of letters are input as an answer, the next letter (a second letter, a third letter, . . . ) continues to be input). On the other hand, when the transmission button 108 has been pressed (YES in step S69), the recognized letter code 548 is read out from the work area 547 and is transmitted to the Wii (step S70). In this case, in order to indicate that each transmitted packet is of a recognized letter code, a flag indicating that the packet includes the recognized letter code is set into the header of the packet before being transmitted to the Wii. Also, a process of hatching and causing the handwriting input area 105 not to receive an input is performed. Thus, the answer process is ended.

Thus, the letter recognition process is executed in the DS, and only the recognition result is transmitted to the Wii. Therefore, the process load of the Wii can be reduced as compared to when the letter recognition process is executed in the Wii. Also, the amount of communication between the Wii and the DS can be reduced, thereby making it possible to increase the speed of the whole process.

Referring back to FIG. 35, following the answer process in step S50, it is determined whether or not the game is ended (step S51). As a result, when it is determined the game is not ended (NO in step S51), the flow returns to step S47 and the process of step S47 is repeated. On the other hand, when it is determined that the game is ended (YES in step S51), a process of cutting off communication with the Wii is executed (step S52). Thus, the game process in the DS of step S6 of FIG. 11 is ended.

Next, the post-process in the Wii of step S7 of FIG. 11 will be described in detail. If the game process is ended, a process of saving information about the details of answers of each player in the latest game process as an answer history into the flash memory 17, is performed (step S29). The process of step S29 will be described in more detail. Initially, the answer detail 129 is read out from the work area 127 of the Wii. As described above, the answer detail 129 stores information about the details of answers including whether an answer is correct or incorrect for each question asked in the latest quiz game process, and the like, which is stored for each DS number. Next, the Mii number 1261 is retrieved from the hand-held apparatus correspondence table 126 based on the DS number 1291 included in the answer detail 129. Next, the save data 172 is accessed to search for data having the Mii number 1721 corresponding to the retrieved Mii number 1261 (if no data is found as a result of the search, data is newly created). Next, the answer history 1293 is read out from the answer detail 129. The answer history 1293 is stored as the answer history data 1722 (as the save data 172 into the flash memory 17). Thereby, the answer history of each player in the latest quiz game process is saved in the Wii in association with the Mii used by the player. Thereby, if the previously used Mii is used in the quiz game at another time, the player can play the quiz game, taking over the previous answer history, such as the percentage of question answered correctly and the like. Further, a question may be selected as a "question which Mr. or Ms. XX is not good at", based on the percentage of questions answered correctly or the like of each Mii. Thus, the quiz game process of this embodiment is ended.

Thus, by executing the letter recognition process in the DS and transmitting only the recognition result, the processing load of the Wii can be reduced as compared to when the letter recognition process is performed in the Wii. Also, the amount of communication between the Wii and the DS can be reduced. As a result, the speed of the whole game process can be increased.

Also, in the game process of the stationary game apparatus as described above, by using a hand-held game apparatus for general game processes (particularly, a hand-held game apparatus having an input device (e.g., a touch panel, etc.) with which inputting can be intuitively performed) in association with the stationary game apparatus, various input manners can be provided. In particular, when hand-held game apparatuses are widespread, various games can be provided with low cost as compared to when a touch panel or the like is separately provided as a dedicated input device.

Further, by saving an answer history into the Wii main body in association with the Mii, a process can be performed based on the result of a previous play. For example, from the answer history, only data of questions having a low percentage of questions answered correctly is extracted. Based on the data, a predetermined question is selected. The selected question may be asked as a "question which is often incorrectly answered by Mr. or Ms. XX". Thus, a characteristic of a player is saved and is used to select a question, thereby making it possible to cause a quiz game to be more enjoyable. In other words, a predetermined setting file (Mii) is set in the Wii main body, a hand-held game apparatus is related to the setting file, and a process is performed while the hand-held game apparatus is associated with the stationary game apparatus, thereby making it possible to provide a variety of games.

Note that, in the above-described embodiment, handwritings of the players based on the stroke data transmitted from the DSs are simultaneously displayed as answers on the television 2 after all the four players complete their answers. The present invention is not limited to this. Every time stroke data is transmitted, a writing stroke of a player may be displayed on the television 2 (i.e., in real time). For example, writing strokes are not displayed until three of the four players complete their answers, and when three players complete their answers, writing strokes of the remaining player may be displayed in real time (writing strokes are displayed in real time only in one corresponding to the remaining player of the areas 113a to 113d of FIG. 21). Thereby, the quiz game can be caused to be more enjoyable.

Also, although stroke data is transmitted from the DS to the Wii on a frame-by-frame basis in the above-described embodiment (step S62), the present invention is not limited to this. Alternatively, stroke data may be accumulated, and when a letter code indicating the result of recognition is transmitted (step S70), all the stroke data 544 may be read out and transmitted. When a handwriting does not need to be displayed, stroke data may not be transmitted. In this case, the amount of communication can be further reduced.

Also, although HIRAGANA, KATAKANA and KANJI letters are recognized as an example in the above-described embodiment, the present invention is not limited to this. Graphics, such as circles, triangles, quadrangles and the like, may be recognized.

Also, in the above-described embodiment, the DS receives an answer program which is transmitted from the Wii. The transmission source of an answer program is not limited to the Wii. For example, an answer program may be received via the Internet from a predetermined server. Also, although data in the program storage area 120 and the data storage area 123 is data which is previously stored on the disc 4 and is then copied into the internal main memory 11e or the external main memory 12 during a quiz game process in the above-described embodiment, the data may be read out and copied from the built-in flash memory 17 instead of the disc 4. In this case, for example, data downloaded via the Internet can be stored into the flash memory 17.

The DS held by each player may be caused to perform a process of a FEP (Front End Processor) or the like for the letter recognition process. In this process, a process of storing the peculiarity of handwriting of each player into the DS main body may be executed. Further, based on the stored peculiarity, the result of letter recognition for each player may be modified so that the accuracy of the letter recognition is increased. Further, data about the peculiarity may be related to the Mii selected by each, and may be saved as a portion of the save data into the Wii main body.

Also, in step S69, when the transmission button 108 is pressed, a recognized letter code (i.e., the details of an answer of a player) is transmitted to the Wii. In this case, a value indicating a similarity between the recognized letter and the handwriting may also be transmitted to the Wii. Assuming that the overall result display is performed, for example, if there are players having the same scores, the superiority or inferiority of the players may be determined based on the values indicating the similarities. Also, when adjustment is performed based on the correct answer information 1254 during the letter recognition process as described above, a value indicating the similarity before the adjustment may be used.

Also, although a hand-held game apparatus having two display devices has been described as an exemplary hand-held game apparatus in this embodiment, a hand-held terminal comprising a single display device on the screen of which a touch panel is provided may be used. Also, although a touch panel has been described as an exemplary device for detecting a position designated by a player in an operation area in this embodiment, a so-called pointing device which enables a player to designate a position in a predetermined area may be used, including, for example, a mouse capable of designating any position on a screen, a tablet capable of designating any position on an operation plane which does not have a display screen, or the like. Alternatively, a device comprising an imaging means for capturing an image of a display screen or a marker or the like in the vicinity of a display screen, may be used. In such a pointing device, a coordinate point on a display screen corresponding to a position designated on the display screen may be calculated from a position of the display screen or the marker in the captured image obtained by designating a direction of the display screen.

(Variation 1)

Figure 37:
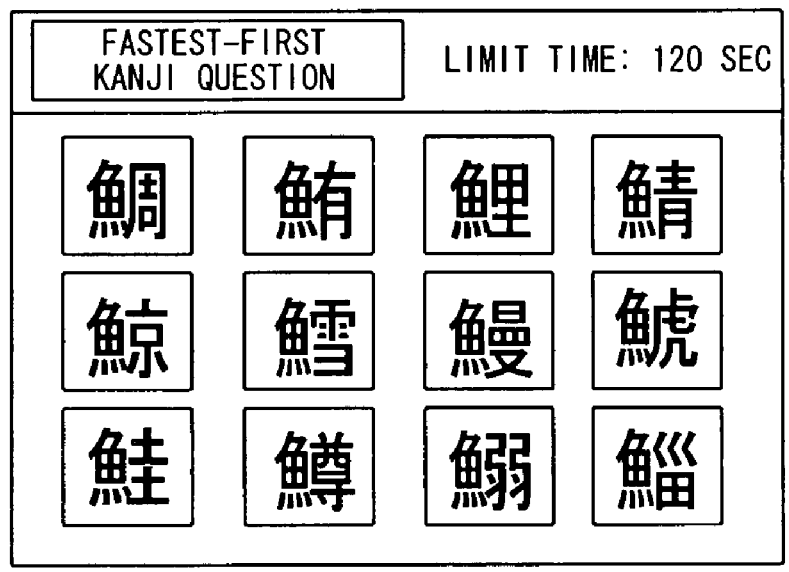
FIG. 37 is a diagram showing an exemplary screen of the quiz game of this embodiment.
Figure 38:
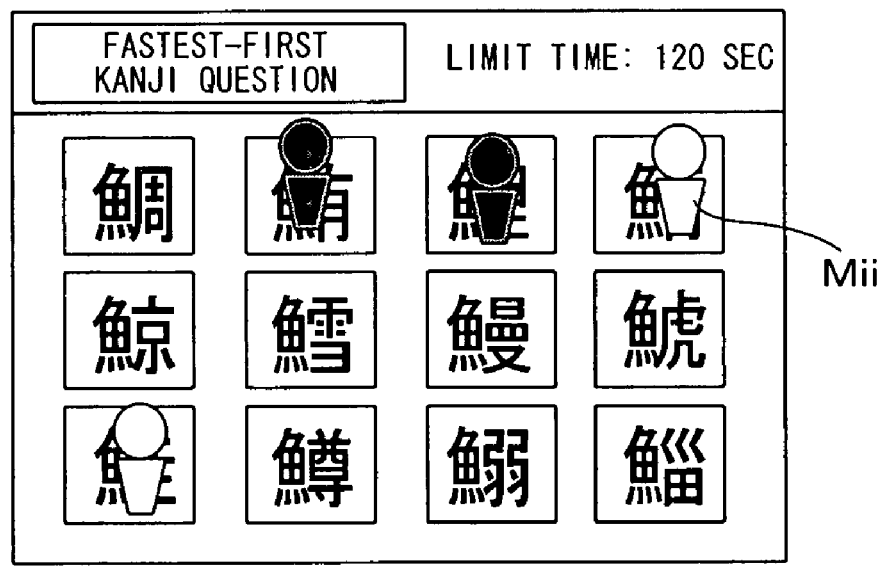
FIG. 38 is a diagram showing an exemplary screen of the quiz game of this embodiment.

In the above-described embodiment, a "working-together question" has been described an exemplary question answering manner. Here, a "fastest-first question" as am example of another answering manner will be described. FIG. 37 shows an exemplary question screen displayed on the television 2 in the fastest-first question. In this answering manner, each player answers how to read twelve KANJI letters displayed on a screen by the player writing by hand on his/her DS. The "reading" needs to be input with HIRAGANA or KATAKANA letters. For a KANJI whose reading is correctly answered, the Mii of a player who has correctly answered is displayed, overlapping the KANJI letter as shown in FIG. 38, which indicates that the answer has been provided. Each player inputs the readings of KANJI letters which the player can read, and the players compete on the number of correct answers. Also, because of the fastest-first question, when a plurality of players transmit their answers with respect to the same KANJI letters during a correct answer determining process in the Wii, an answer of a player which has been received earliest is accepted.

Next, a process for the fastest-first question will be described. In the case of the fastest-first question, in step S19 of FIG. 34, the answering manner 1252 in which "fastest first" is set is transmitted from the Wii to the DS. Also, as described above, the fastest-first question is a question for which HIRAGANA or KATAKANA letters are used to answer. Therefore, the KANA priority flag 1255 in which "YES" is set is transmitted. In a DS which has received this, the fastest-first question program 5412 is executed in step S48 of FIG. 34. Thereafter, the process of step S49 is performed before the answer process of FIG. 36 is executed. In this case, since the KANA priority flag 1255 is set as YES, pattern matching is performed only in terms of HIRAGANA or KATAKANA letters during the letter recognition process of the answer process, specifically, the process of step S66 (i.e., a kind of filtering). Therefore, the accuracy of letter recognition can be increased. Also, the speed of letter recognition can be increased as compared to when KANJI letters are also recognized. Therefore, in a game in which players compete on the speed of answering, such as a fastest-first question or the like, the response to a player's input can be improved, which is particularly effective. Although filtering which causes KANJI letters not to be recognized is performed, filtering which causes only KANJI letters to be recognized may be performed, depending on the question.

Thus, a flag, such as the KANA priority flag, is used, depending on a characteristic of an asked question, to perform adjustment of a process relating to inputting by a player (filtering in the letter recognition process in this embodiment), thereby making it possible to avoid stress on a player in terms of an input operation.

(Variation 2)

Also, when an answer is input, a speech recognition process may be used instead of the above-described letter recognition process. For example, a player utters the details of an answer toward the microphone 56. The utterance is stored as speech data into the RAM 54 of the DS. Next, the speech data is subjected to speech recognition using a predetermined speech recognition algorithm, and the result of the recognition is stored as text data into the RAM 54. Thereafter, based on the text data, a letter code of a letter indicating the utterance may be transmitted to the Wii. This is particularly effective when it is difficult to cause the game to smoothly proceed in terms of the communication rate (bandwidth) or the processing load of the Wii. For example, if speech data input in the DS is transmitted as it is (i.e., raw speech recorded in the DS) to the Wii, it may take a long time to transmit or receive the data. Also, if the speech recognition process is executed in the Wii, the processing load becomes large, so that the overall processing speed is reduced, i.e., a long response time. In such a case, by executing the speech recognition process in the DS and transmitting only the result to the Wii, the overall speed of the game process can be increased.

While the invention has been described in detail, the foregoing description is in all aspects illustrative and not restrictive. It is understood that numerous other modifications and variations can be devised without departing from the scope of the invention.

What is claimed is:

1. A game system for performing a game via communication between a stationary game apparatus and a plurality of hand-held game apparatuses, wherein
the plurality of hand-held game apparatuses each comprise:
a hand-held-side display device for displaying an image;
a pointing device for designating a position on a screen of the hand-held-side display device;
a transmitter and a receiver for respectively transmitting and receiving data to and from the stationary game apparatus;
a non-transitory storage medium for storing a hand-held device program including at least a recognition program for recognizing a letter or graphic that is input by writing by hand;
a processing system configured to:
execute the recognition program to recognize the letter or graphic input by writing by hand using the pointing device; and
cause the transmitter to transmit recognition result data which is data of the recognized letter or graphic to the stationary game apparatus,
the stationary game apparatus comprises:
a transmitter and a receiver for transmitting and receiving data respectively to and from each hand-held game apparatus;
a processing system configured to:
execute a game process based on the recognition result data received from each of the plurality of hand-held game apparatuses; and
cause a predetermined display device to display a result of the game process.

2. The game system according to claim 1, wherein
the transmitter of the stationary game apparatus is set to transmit the hand-held device program to each of the plurality of hand-held game apparatuses,
the receiver of each of the plurality of hand-held game apparatuses is set to receive the hand-held device program transmitted from the stationary game apparatus, and
the hand-held device program includes a letter recognition program and the processing system of each of the plurality of hand-held game apparatuses is further configured to execute by reading out and executing the letter recognition program.

3. The game system according to claim 1, wherein
the transmitter is set to transmit handwriting data indicating a series of designated coordinate points input by writing by hand using the pointing device,
the processing system of the stationary game apparatus is further configured to cause the predetermined display device to display a handwriting image based on the handwriting data.

4. The game system according to claim 2, wherein
the transmitter is set to transmit handwriting data indicating a series of designated coordinate points input by writing by hand using the pointing device, the processing system of the stationary game apparatus is further configured to cause the predetermined display device to display a handwriting image based on the handwriting data.

5. The game system according to claim 1, wherein the processing system of each of the plurality of hand-held game apparatuses is further configured:
   to cause the hand-held-side display device to display the recognized letter or graphic as a recognition result letter, and
   to cause the transmitter to transmit data indicating the recognition result letter as the recognition result data in accordance with a predetermined input operation.

6. The game system according to claim 2, wherein the processing system of each of the plurality of hand-held game apparatuses is further configured:
   to cause the hand-held-side display device to display the recognized letter or graphic recognized by the letter recognition process program as a recognition result letter, and
   to cause the transmitter to transmit data indicating the recognition result letter as the recognition result data in accordance with a predetermined input operation.

7. The game system according to claim 1, wherein the processing system of the stationary game apparatus is further configured to analyze a result of a game based on the received recognition result data for each hand-held game apparatus which is a transmission source of the recognition result data; and
   the stationary game apparatus further comprising a non-transitory storage medium a for storing the analyzed result in association with predetermined setting data of the transmission-source hand-held game apparatus.

8. The game system according to claim 1, wherein the transmitted data includes priority result data indicating predetermined recognition result data, and
   the processing system of each of the plurality of hand-held game apparatuses is further configured to cause the output of recognition process result data indicated by the priority result data with priority in the recognition process.

9. The game system according to claim 2, wherein the stationary game apparatus further comprises:
   priority result transmitting programmed logic circuitry for causing the transmission of priority result data indicating predetermined recognition result data to the hand-held game apparatus, and
   the processing system of each of the plurality of hand-held game apparatuses is further configured to cause the output of recognition process result data indicated by the priority result data with priority.

10. The game system according to claim 1, wherein the transmitter of the stationary-side game apparatus is set to transmit recognition range data for limiting letters or graphics to be recognized by each of the plurality of hand-held game apparatuses, and
    the processing system of each of the plurality of hand-held game apparatuses is further configured to select recognition result data from the letters or graphics set based on the recognition range data.

11. The game system according to claim 2, wherein the stationary-side game apparatus further comprises:
    a recognition range transmitting programmed logic circuitry for causing the transmission, to the hand-held game apparatus, of recognition range data for limiting letters or graphics to be recognized, and
    the processing system of each of the plurality of hand-held game apparatuses is further configured to select recognition result data from the letters or graphics set based on the recognition range data.

12. A game system for performing a game via communication between a stationary game apparatus and a plurality of hand-held game apparatuses, wherein
    the plurality of hand-held game apparatuses each comprise:
    a hand-held-side display device set to display an image;
    a microphone;
    a hand-held-side transmitter and receiver for respectively transmitting and receiving data to and from the stationary game apparatus;
    a memory storage medium set to store a hand-held device program including at least a speech recognition program for recognizing speech input using the microphone;
    a processing system configured to:
    execute the speech recognition program to perform a process of recognizing the speech input using the microphone; and
    cause the hand-held-side transmitter to transmit recognition result data which is data of the recognized speech to the stationary game apparatus,
    the stationary game apparatus comprises:
    a stationary-side transmitter and receiver for respectively transmitting and receiving data to and from each hand-held game apparatus;
    a processing system configured to:
    execute a game process based on the recognition result data received from each one of the plurality of hand-held game apparatuses; and
    cause a predetermined display device to display a result of the game executed.

13. An information processing system for performing an information process via communication between a stationary information processing apparatus and a plurality of hand-held information processing apparatuses, wherein
    the plurality of hand-held information processing apparatuses each comprise:
    a hand-held-side display device set to display an image;
    a pointing device for designating a position on a screen of the hand-held-side display device;
    a hand-held-side transmitter and receiver for respectively transmitting and receiving data to and from the stationary information processing apparatus;
    a memory storage device for storing a hand-held device program including at least a recognition program for recognizing a letter or graphic input by writing by hand;
    a processing system configure to:
    execute the recognition program to perform a process of recognizing the letter or graphic input by writing by hand using the pointing device; and
    cause the hand-held-side transmitter to transmit recognition result data which is data of the recognized letter or graphic to the stationary information processing apparatus, and
    the stationary information processing apparatus comprises:
    a stationary-side transmitter and receiver for respectively transmitting and receiving data to and from each hand-held information processing apparatus;

a processing system configured to:
    execute a predetermined information process based on the recognition result data received from each one of the plurality of hand-held information processing apparatuses; and
    cause a predetermined display device to display a result of the information process executed.

14. A recording medium storing a program which is executed by a computer in a stationary game apparatus of a game system in which a game is performed via communication between a stationary game apparatus and a plurality of hand-held game apparatuses, the program causing the computer to execute:
    transmitting, to each of the plurality of hand-held game apparatuses, data including at least a letter recognition program for performing a handwritten letter recognition based on coordinates input by the hand-held game apparatus, and transmitting letter data indicating a letter specified by the recognition to the stationary game apparatus;
    receiving the letter data from each of the plurality of hand-held game apparatuses;
    performing a game process based on the letter data; and
    displaying a game image based on the game process on a predetermined display device.

15. The game system of claim 12 wherein the a processing system of the stationary game apparatus is further configured to cause the predetermined display to display a handwriting image associated with transmitted handwritten data.

16. The information processing system of claim 13 wherein the a processing system of the stationary information processing apparatus is further configured to cause the predetermined display to display a handwriting image associated with transmitted handwritten data from each of the plurality of hand-held information processing apparatuses.

17. The recording medium of claim 14 wherein the program causes the computer to further execute displaying a handwritten image based on the letter data received from each of the plurality of hand-held game apparatuses.

\* \* \* \* \*